(12) United States Patent
Akamatsu et al.

(10) Patent No.: US 7,617,677 B2
(45) Date of Patent: Nov. 17, 2009

(54) STATOR UNIT FOR A TORQUE CONVERTER

(75) Inventors: Hideki Akamatsu, Iwata (JP); Takahide Saito, Iwata (JP); Yasumasa Hibi, Iwata (JP); Takashi Hattori, Iwata (JP); Katsufumi Abe, Iwata (JP)

(73) Assignee: NTN Corporation, Osaka (JP)

( * ) Notice: Subject to any disclaimer, the term of this patent is extended or adjusted under 35 U.S.C. 154(b) by 302 days.

(21) Appl. No.: 11/723,629

(22) Filed: Mar. 21, 2007

(65) Prior Publication Data

US 2007/0220875 A1  Sep. 27, 2007

(30) Foreign Application Priority Data

Mar. 22, 2006 (JP) ............................ 2006-078682
Mar. 22, 2006 (JP) ............................ 2006-079287
Aug. 21, 2006 (JP) ............................ 2006-224051

(51) Int. Cl.
*F16D 33/00* (2006.01)
(52) U.S. Cl. .......................................... 60/345; 60/361
(58) Field of Classification Search ................... 60/339, 60/341, 345, 361, 365; 192/41 A
See application file for complete search history.

(56) References Cited

U.S. PATENT DOCUMENTS 2,881,886 A * 4/1959 Troendly et al. .......... 192/41 A
4,130,191 A * 12/1978 Judd et al. ................. 192/41 A
4,360,093 A * 11/1982 Wakabayashi et al. ..... 192/41 A
4,494,636 A    1/1985 Wakabayashi et al.
5,282,362 A *  2/1994 Renneker et al. .............. 60/345
5,842,548 A * 12/1998 Sato et al. ................. 192/41 A
6,941,752 B2 * 9/2005 Ochi et al. ..................... 60/345

FOREIGN PATENT DOCUMENTS

| JP | 58-163832 | 9/1983 |
| JP | 59-073632 | 4/1984 |
| JP | 2003-343690 | 12/2003 |
| JP | 2005-214312 | 8/2005 |

* cited by examiner

*Primary Examiner*—Michael Leslie
(74) *Attorney, Agent, or Firm*—Wenderoth, Lind & Ponack, LLP.

(57) ABSTRACT

A stator unit for a torque converter includes a stator, a one-way clutch mounted radially inside the stator, and thrust bearings provided on both axial sides of the one-way clutch. The one-way clutch includes an outer ring having a peripheral wall and side walls extending radially inwardly from the respective side edges of the peripheral wall and each having a flange formed at the radially inner edge thereof, an inner ring which is in sliding contact with the flanges, and sprags disposed between the inner surface of the peripheral wall and the outer surface of the inner ring. Each of the thrust bearings has a stake which is pressed into one of engaging steps formed in the radially inner surface of the stator until the bearing ring of the thrust bearing is pressed against one of the side walls and one of axial end surfaces of the inner ring, thereby retaining the component parts so as to be inseparable from the stator.

14 Claims, 18 Drawing Sheets

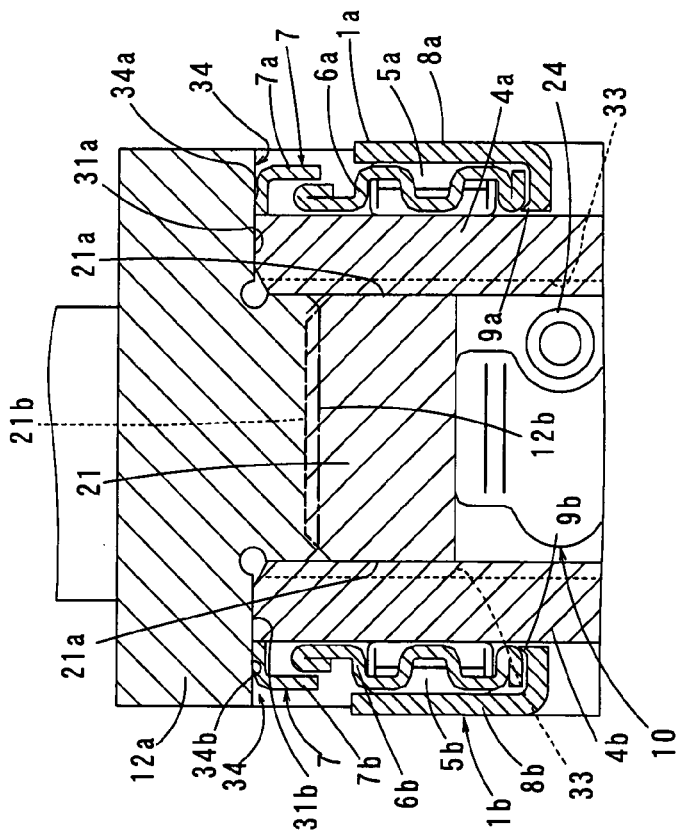
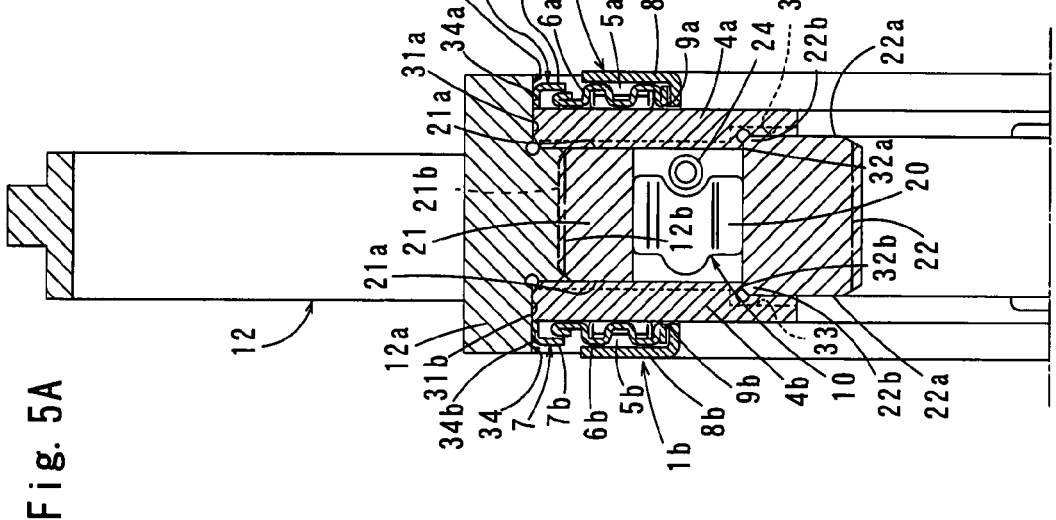
Fig. 5A
Fig. 5B

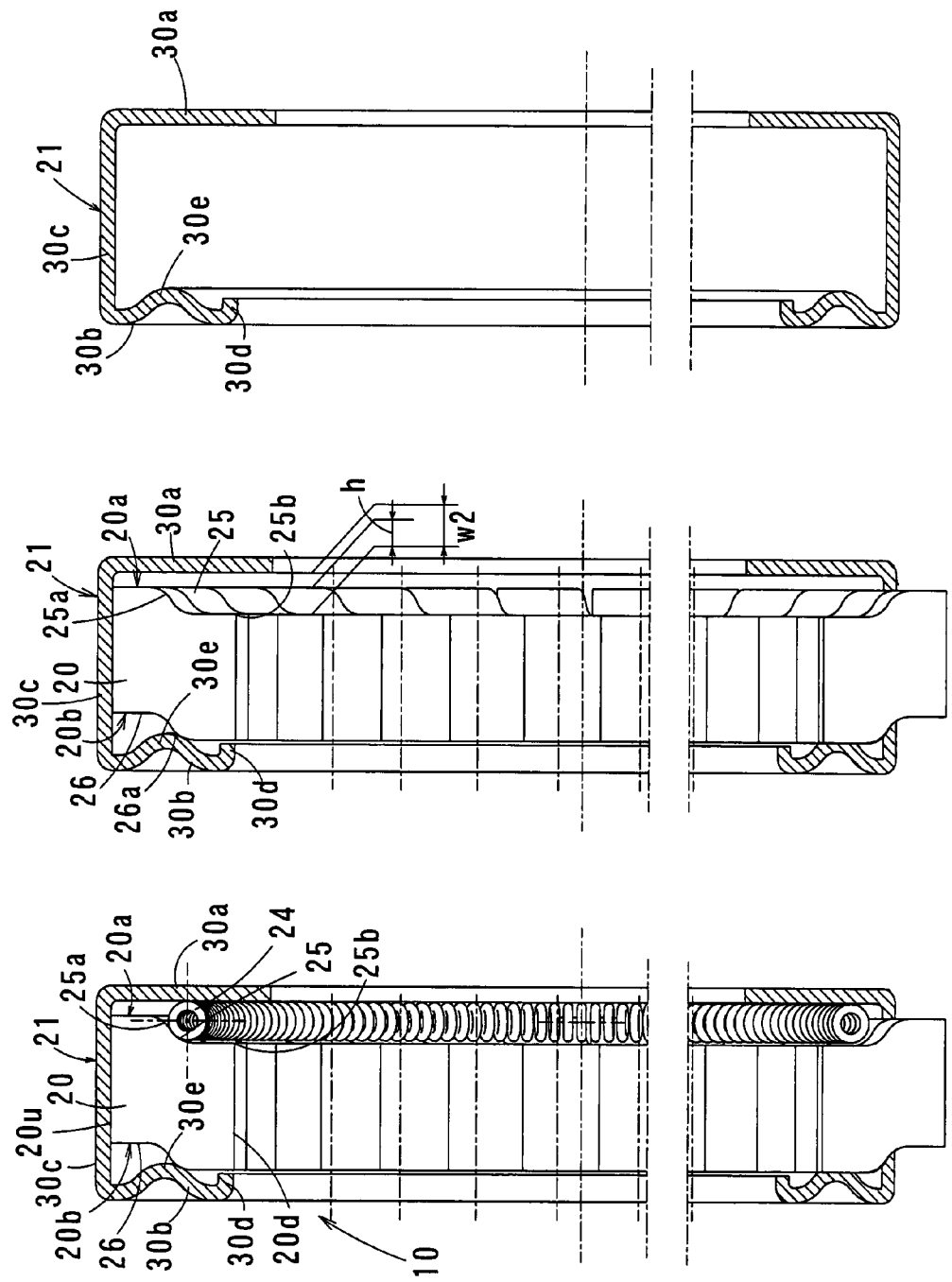

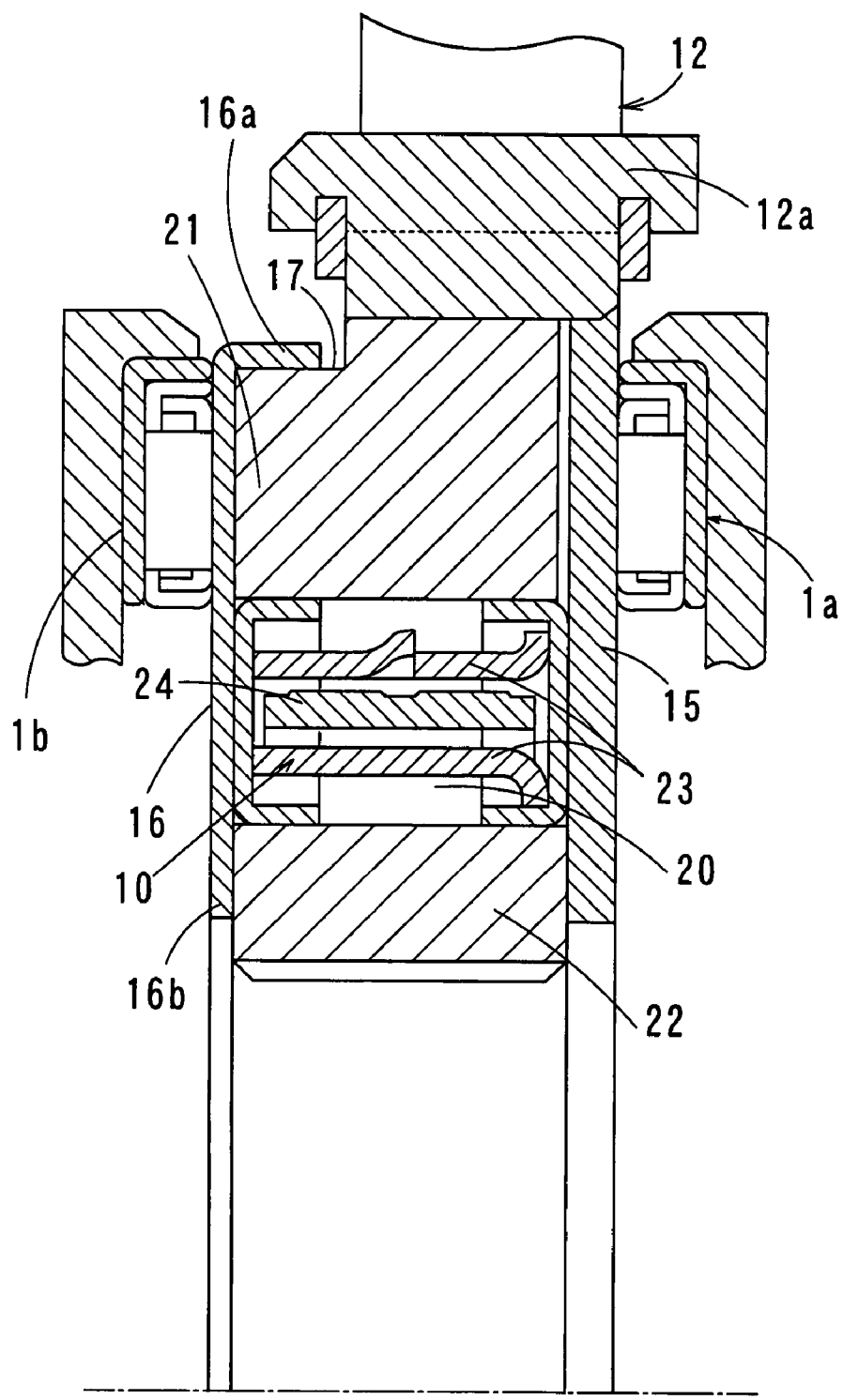

STATOR UNIT FOR A TORQUE CONVERTER

BACKGROUND OF THE INVENTION

This invention relates to a stator unit mounted in a torque converter of a motor vehicle.

As shown in FIG. 17, a torque converter comprises an impeller 11 coupled to an output shaft of the engine, a turbine 13 coupled to an input shaft of the transmission and opposed to the impeller 11, and a stator 12 mounted through a one-way clutch 10 on a stator shaft fixed to a casing.

The stator 12 changes the flow direction of fluid that circulates between cup-shaped impeller blades 11b and turbine blades 13b when the fluid is returned from the turbine 13 to the impeller 11 at the radially inner portion of the blades 11b and 13b, thereby applying a turning force to the impeller 11 in the direction in which the impeller 11 is turning, and thus amplifying the torque transmitted between the impeller 11 and the turbine 13.

The one-way clutch 10 comprises an outer ring 21 joined to a stator hub 12a of the stator 12, an inner ring 22 joined to the stator shaft, a plurality of sprags 20 arranged circumferentially in an annular space defined between the inner and outer rings 22 and 21, and an annular retainer 23 retaining the sprags 20. The one-way clutch 10 permits rotation of the stator 12 in one direction only.

The outer ring 21 is heat-treated when formed. The outer ring 21 and the retainer 23 each have one axial end thereof supported on an end wall 12a' of the stator hub 12a, and have their other axial ends pressed from outside by a presser plate 14. The outer ring 21 and the retainer 23 are supported by the stator hub 12a while being sandwiched between the end wall 12a' and the presser plate 14.

Thrust bearings 1a and 1b are mounted between the stator 12 and the impeller 11 and between the stator 12 and the turbine 13, respectively, to bear axial loads applied to the stator 12. The thrust bearings 1a and 1b each comprise bearing rings, radially extending rollers, and a retainer retaining the bearing rings and the rollers.

A stator unit comprising the stator 12, one-way clutch 10, and thrust bearings 1a and 1b is mounted in a torque converter together with the impeller 11, the turbine 13, etc.

Among such stator units, there are known ones including side plates provided axially outwardly of the end wall of the stator hub and the presser plate, respectively, and snap rings each axially positioning one of the side plates, so that the side plates serve as the bearing rings of the respective thrust bearings (as disclosed in JP patent publication 2003-343690A).

Also, as shown in FIG. 18, there are known stator units in which a small-diameter step 17 is formed on the outer periphery of the outer ring 21 at one axial end thereof so as to be smaller in diameter than the remaining portion of the outer periphery of the outer ring 21. The bearing ring 16 of the thrust bearing 1b has its radially outer end portion 16a bent along the small-diameter step 17 so as to directly engage the outer ring 21 not through any intervening member. Also, the bearing ring 16 has its radially inner end portion 16b protruding radially inwardly of the outer periphery of the inner ring 22 so as to axially and directly oppose the end surface of the inner ring 22 not through any intervening member (as disclosed in JP patent publication 2005-214312A).

Some of such one-way clutches include sprags disposed between the inner and outer rings and configured to selectively engage and disengage from the inner and outer rings according to the relative position of the inner and outer rings, thereby selectively transmitting torque between the inner and outer rings.

The sprags of some of such one-way clutches are circumferentially spaced apart from each other, and the sprags of other such one-way clutches are kept in contact with the circumferentially adjacent sprags.

There is known a sprag type one-way clutch of the former type in which the numerous sprags are disposed annularly between the inner and outer rings, retained by a retainer, and biased by a spring called a garter spring in a direction in which the sprags engage, and which includes a pair of annular side plates each provided on one side of the sprags (one axial end of the clutch) (as disclosed in JP patent publication 59-73632A, FIG. 3).

There is known a sprag type one-way clutch of the latter type in which the numerous sprags are disposed annularly between the inner and outer rings so as to be sandwiched between a garter spring and a retainer, and biased by the garter spring in a direction in which the sprags engage, and which includes annular plates each disposed between one side of the sprags and the retainer (as disclosed in JP patent publication 58-163832A).

The stator unit disclosed in the abovementioned JP patent publication 2003-343690A has a large axial dimension because the bearing ring of one of the thrust bearings is located axially outwardly of the end wall of the stator hub.

The stator unit disclosed in the abovementioned JP patent publication 2005-214312A has a problem in that some of the parts forming the one-way clutch, such as the thrust bearings and sprags, could come off the clutch when the stator unit is mounted to the torque converter, because one of the bearing rings of the thrust bearings is fixed to the outer ring. Thus, a stator unit that can be handled more easily is desired.

Such a conventional one-way clutch used for a stator unit are assembled by inserting the numerous sprags one after another into the space between the inner and outer rings, and every time each sprag is inserted or after all of the sprags have been inserted, the sprags are brought into engagement with the garter spring one at a time. Thus, during assembly of the one-way clutch, their sprags tend to fall off.

In order to prevent separation of sprags during assembly of the one-way clutch, the garter spring could be mounted before inserting the sprags. But because the space into which the sprags are inserted is narrow, if the garter spring is inserted into this space before the sprags, the garter spring will interfere with the sprags, thus making it difficult to insert the sprags in position.

To solve these problems, there is known a one-way clutch as shown in FIGS. 15A and 15B which includes a cup-shaped outer ring 21 having a U-shaped section, wherein one of two axially opposed side walls 30a and 30b of the outer ring 21, i.e. the wall 30a, in which the garter spring 24 is inserted, is left unworked when the one-way clutch is assembled.

With the side wall 30a of the outer ring 21, in which the garter spring 24 is inserted, not bent radially inwardly, the sprags 20 and the garter spring 24, which is adapted to fit in recesses 25 of the sprags 20, are inserted as shown in FIG. 16A. Then, the side wall 30a is bent radially inwardly as shown in FIG. 16B. Finally, a flange 30d is formed at the radially inner end portion of the side wall 30a as shown in FIG. 16C.

In this arrangement, the side wall 30a of the outer ring 21 has to be bent radially inwardly with the sprags 20 and the garter spring 24 mounted in the outer ring 21. This is because if the side wall 30a of the outer ring 21 is completely bent radially inwardly relative to its peripheral wall 30c (as shown in FIG. 16B) beforehand, it is difficult to insert the sprags 20 and the garter spring 24 into the outer ring 21 because the gap w1 defined between the side wall 30a and protrusions 20d of the sprags 20 are small.

When the side wall 30a of the outer ring 21 is bent radially inwardly relative to its peripheral wall 30c with the sprags 20 and the garter spring 24 mounted in the outer ring 21, the sprags 20 and the garter spring 24 tend to move, thus making it difficult to accurately keep the bent position and shape of the side wall 30a.

Also, such work is troublesome and thus tends to push up the manufacturing cost of the entire one-way clutch.

SUMMARY OF THE INVENTION

An object of the present invention is to reduce the axial dimension of a stator unit of the above-described type and to prevent separation of parts of its thrust bearings or one-way clutch when the stator is mounted in the torque converter. Another object of the invention is to make it easy to mount the sprags and garter spring in the outer ring of the one-way clutch and to form the outer ring by bending.

In order to achieve the first object, the present invention provides a stator unit for a torque converter including an impeller and a turbine, the stator unit comprising a stator disposed between the impeller and the turbine of the torque converter, a one-way clutch disposed between the stator and a stator shaft, and thrust bearings each disposed between the stator and one of the impeller and the turbine, the one-way clutch comprising an outer ring comprising a peripheral wall extending over the entire circumference, first and second side walls each extending radially inwardly from one of two axial side edges of the peripheral wall, and first and second flanges extending axially inwardly from radially inner edges of the first and second side walls, respectively, the outer ring being fixed to a radially inner portion of the stator, an inner ring which can be fixed to the stator shaft and having an outer surface that is in sliding contact with the first and second flanges, and sprags disposed in the outer ring between an inner surface of the peripheral wall and an outer surface of the inner ring so as to be selectively engageable with the inner surface of the peripheral wall and the outer surface of the inner ring.

By using such a shell type outer ring, it is not necessary to provide the stator hub with side plates, so that it is possible to reduce the axial dimension of the stator unit and minimize the possibility of separation of the sprags from the outer ring, which is fixed to the stator, when the stator unit is mounted in the torque converter.

In one embodiment, each of the thrust bearings comprises a bearing ring, rollers supported on the bearing ring so as to roll on the bearing ring, and a stake, each of the thrust bearings being pressed into the stator from one of two axial sides thereof until an axial inner surface of the bearing ring is pressed against one of the first and second side walls of the outer ring and one of two axial end surfaces of the inner ring.

With this arrangement, the stakes of the thrust bearings are securely fixed to the radially inner portion of the stator, so that the component parts of the one-way clutch and the thrust bearings are inseparably held in position by the stakes and the bearing rings. This minimizes the possibility of separation of the component parts of the stator unit. It is therefore possible to prevent separation of the component parts of the thrust bearings and the one-way clutch when mounting the stator unit in the torque converter.

Because the bearing rings and the stakes of the thrust bearings also serve as members for inseparably retaining the component parts of the one-way clutch to the stator, it is possible to reduce the number of parts of the stator unit and further reduce the axial dimension of the stator unit.

The stator may have radially inner engaging steps on both axial sides thereof, the thrust bearings being pressed into and fixed to the stator by pressing the stakes into the respective engaging steps.

In another arrangement, each of the thrust bearings comprises a bearing ring, rollers supported on the bearing ring so as to roll on the bearing ring, and a stake, the stator having radially inner engaging steps on both axial sides thereof, the bearing ring of each of the thrust bearings being fixed to a radially inner portion of the stator by crimping a radially inner portion of the stator that is opposed to one of the stakes with the stake in contact with one of the respective engaging steps so that an axial inner surface of the bearing ring is pressed against one of the first and second side walls of the outer ring and one of two axial end surfaces of the inner ring.

Because the stakes of the thrust bearings are fixed to the stator by press-fitting or by crimping, separate fixing members such as snap rings are not necessary. Thus, it is possible to further reduce the number of parts of the stator unit and further reduce the axial dimension of the stator unit.

The bearing ring of each of the thrust bearings may be formed with lubricating grooves in an axially inner surface thereof that extend from a radially inner edge thereof toward a radially outer edge thereof. With this arrangement, lubricating oil supplied into the lubricating grooves reduces friction loss, thus preventing e.g. heat build-up due to sliding movement. Such lubricating grooves also serve as oil passages for controlling the torque converter (for turning on and off the lockup clutch).

In order to achieve the second object, the present invention provides a stator as described above, wherein the inner ring has an outer cylindrical surface, and the outer ring has an inner cylindrical surface coaxial with and facing the outer cylindrical surface of the inner ring, the first and second side walls of the outer ring extending radially inwardly from both axial sides of the inner cylindrical surface of the outer ring, the sprags being disposed between the outer cylindrical surface of the inner ring and the inner cylindrical surface of the outer ring and each having radially outer and inner cam surfaces, the one-way clutch further comprising a garter spring disposed between the sprags and the first side wall to extend in the circumferential direction so as to bias the sprags in such a direction that the radially outer and inner cam surfaces engage the inner cylindrical surface of the outer ring and the outer cylindrical surface of the inner ring, respectively, whereby torque is selectively transmitted between the inner and outer rings through the sprags, each of the sprags having first and second axial end surfaces facing the first and second side walls, respectively, the first axial end surface being formed with a recess extending from an intermediate portion thereof to the radially inner cam surface, the garter spring being received in the recesses of the respective sprags, thereby radially outwardly biasing the sprags.

Such recesses are radially inwardly open, so that between the sprags and the first side wall, a sufficiently large gap is defined to insert the garter spring. The garter spring can thus be inserted easily.

With this arrangement, because the first and second side walls can be formed by bending before inserting the sprags and the garter spring into the outer ring, the side walls can be formed with no parts mounted in the outer ring, so that the side walls can be formed easily with high accuracy.

The radially inner cam surfaces of the sprags are preferably equal in axial width to the radially outer cam surfaces of the sprags.

Since the recess of each sprag for receiving the garter spring is radially inwardly open, the axial edge of the radially inner cam surface facing the first side wall is axially offset from the axial edge of the radially outer cam surface facing the first side wall toward the second side wall by a distance equal to the depth of the recess.

Preferably, the axial edge of the radially inner cam surface facing the second side wall is axially offset from the axial edge of the radially outer cam surface facing the second side wall toward the second side wall so that the radially inner and outer cam surfaces have equal axial widths. This is because if the radially inner and outer cam surfaces have equal axial widths, the sprags can stably engage the inner and outer rings.

Preferably, the second side wall of the outer ring has an axially inwardly extending protrusion, the sprags having their second axial end surfaces in abutment with the protrusion.

By bringing the end surfaces of the sprags into abutment with the protrusions of the second side wall, the end surfaces of the sprags abut the outer ring at the same areas, which suppresses skewing of the sprags. This in turn prevents insufficient engaging force and also prevents wear between the side bearing portions and the axial end surfaces of the sprags.

In this arrangement, if the radially inner and outer cam surfaces have equal axial widths, because the radially inner cam surfaces are offset from the radially outer cam surfaces toward the second side wall, radially outer pressing force transmitted from the inner ring to the sprags through their respective radially inner cam surfaces acts on points of the radially outer cam surfaces that are offset from the mid-point between the axial edges of the respective radially outer cam surfaces.

With this arrangement, because the end surfaces of the sprags facing the second side wall are in abutment with the protrusion formed on the second side wall, the protrusion can resist the pressing force that acts on the sprags at their points offset toward the second side wall and is higher than the pressing force that acts on the sprags at their points offset toward the first side wall. The protrusion thus reliably prevents skewing of the sprags.

A gap defined between a free end of the first flange and each of the sprags may be smaller than the diameter of the garter spring.

The sprags are biased radially outwardly by the garter spring, and the sprags and the garter spring elastically push each other between the first and second side walls. Thus, after the one-way clutch has been assembled, the sprags and the garter spring are less likely to separate from the outer ring. But by forming the first flange by axially inwardly bending the radially inner edge of the first side wall, the garter spring cannot pass through the gap between the first side wall and the sprags, so that it is possible to more positively prevent separation of the garter spring.

By forming the flanges, because the radially inner surfaces of the flanges can be brought into sliding contact with the inner ring, the sprags can more stably engage the inner and outer rings.

When the first flange is formed by bending the first side wall, it can be relatively easily formed with high accuracy because the sprags and the garter spring are already supported by the first and second side walls.

The distance between the sprags and the first side wall when the garter spring is inserted into the outer ring (before the first flange is formed) should be barely large enough for the garter spring to be able to pass through the gap between the first side wall and the sprags.

Specifically, such a distance is preferably equal to or larger than the diameter of the garter spring. But considering the fact that the diameter of the garter spring can be reduced due to elastic deformation, such a distance may be even slightly smaller than the diameter of the garter spring depending on the extent to which the diameter of the garter spring can be elastically reduced.

From another aspect of the invention, there is provided a method of manufacturing the one-way clutch of the stator unit for a torque converter as described above.

This method comprises forming the first and second side walls of the outer ring, mounting the sprags in the outer ring, fitting the garter spring into the recesses of the sprags from radially inside the outer ring, and forming the first flange by axially bending the radially inner edge of the first side wall.

As another means for achieving the first object, the present invention provides a stator unit for a torque converter including an impeller and a turbine, the stator unit comprising a stator disposed between the impeller and the turbine of the torque converter, a one-way clutch disposed between the stator and a stator shaft, and thrust bearings each disposed between the stator and one of the impeller and the turbine, each of the thrust bearings comprising a bearing ring, and rollers supported on the bearing ring so as to roll on the bearing ring, the one-way clutch comprising an outer ring fixed to a radially inner portion of the stator, an inner ring which can be fixed to an outer surface of the stator shaft, and sprags disposed between an inner surface of the outer ring and an outer surface of the inner ring so as to be selectively engageable with the inner surface of the outer ring and the outer surface of the inner ring, each of the thrust bearings being pressed into the stator from one of two axial sides thereof until an axial inner surface of the bearing ring is pressed against one of two axial end surfaces of the outer ring and one of two axial end surfaces of the inner ring.

With this arrangement, thrust bearings are securely fixed to the radially inner portion of the stator and the component parts of the one-way clutch are inseparably held in position by the bearing rings, so that the component parts of the stator unit can be inseparably held in position. Thus, when the stator unit is mounted in a torque converter, it is possible to prevent separation of the component parts of the thrust bearings and the one-way clutch.

Since the bearing rings of the thrust bearings also serve as members for inseparably retaining the component parts of the one-way clutch relative to the stator, it is possible to reduce the number of parts of the stator unit as well as the axial dimension of the stator unit.

In this arrangement, each of the thrust bearings may further comprise a stake, the stator having radially inner engaging steps on both axial sides thereof, the thrust bearings being pressed into and fixed to the stator by pressing the bearing rings into or against the respective engaging steps and pressing the stakes into the respective engaging steps at their portions axially outside the bearing rings.

The present invention also provides a stator unit for a torque converter including an impeller and a turbine, the stator unit comprising a stator disposed between the impeller and the turbine of the torque converter, a one-way clutch disposed between the stator and a stator shaft, and thrust bearings each disposed between the stator and one of the impeller and the turbine, each of the thrust bearings comprising a bearing ring, rollers supported on the bearing ring so as to roll on the bearing ring, and a stake, the one-way clutch comprising an outer ring fixed to a radially inner portion of the stator, an inner ring which can be fixed to an outer surface of the stator shaft, and sprags disposed between an inner surface of the outer ring and an outer surface of the inner ring so as to be selectively engageable with the inner surface of the outer ring and the outer surface of the inner ring, the stator having radially inner engaging steps on both axial sides thereof, the bearing ring of each of the thrust bearings being fixed to a radially inner portion of the stator by pressing the bearing ring into or against the respective engaging steps and by crimping a radially inner portion of the stator that is opposed to one of the stakes with the stake in contact with one of the respective engaging steps so that an axial inner surface of the bearing ring is pressed against one of two axial end surfaces of the outer ring and one of two axial end surfaces of the inner ring.

Because the thrust bearings are fixed to the stator by press-fitting or crimping, no snap rings or other fixing members are necessary. Thus, it is possible to further reduce the number of parts of the stator unit and to further reduce the axial dimension of the stator unit.

The bearing rings of the thrust bearings may be formed with steps in their axially inner surfaces along the radially inner edges thereof, the inner ring having radially outer shoulder portions which are in sliding contact with the steps of the bearing rings, respectively.

By bringing the inner ring into sliding contact with such steps, such steps serves as side bearings, so that it is possible to further reduce the number of parts and thus to reduce the cost.

In this arrangement, the bearing ring of each of the thrust bearings may be formed with lubricating grooves in an axially inner surface thereof that extend from a radially inner edge thereof toward a radially outer edge thereof. With this arrangement, lubricating oil supplied into the lubricating grooves reduces friction loss, thus preventing e.g. heat build-up due to sliding movement. Such lubricating grooves also serve as oil passages for controlling the torque converter (for turning on and off the lockup clutch).

According to the present invention, because a shell type outer ring is used as the outer ring of the one-way clutch, which is fixed to the radially inner portion of the stator, it is possible to reduce the axial dimension of the stator unit. Also, when the stator unit is mounted in a torque converter, the sprags are less likely to separate from the outer ring, which is fixed to the stator.

Also, because the stakes of the thrust bearings are fixed to the radially inner portion of the stator, and the inner and outer rings and sprags of the one-way clutch and the rollers, retainers and other component parts of the thrust bearings are inseparably fixed in position by the bearing rings and stakes of the thrust bearings. Thus, when the stator unit is mounted in a torque converter, it is possible to prevent separation of the component parts of the thrust bearings and the one-way clutch, and to further reduce the axial dimension of the stator unit.

Also, according to the present invention, because the recess is formed in the end surface of each sprag that faces the first side wall so as to extend from its mid-portion to the radially inner cam surface, and the sprags are biased radially outwardly by the garter spring, which is received in the recesses of the sprags, it is possible to ensure a gap large enough to receive the garter spring between the sprags and the first side wall.

Thus, the sprags and the garter spring can be easily mounted in the outer ring. Also, because the side walls of the outer ring can be formed by bending before the garter spring is inserted, they can be formed easily.

Also, according to the present invention, because the thrust bearings are securely fixed to the radially inner portion of the stator and the component parts such as the inner and outer rings and sprags of the one-way clutch and the thrust bearings are retained by the bearing rings or stakes of the thrust bearings so as to be inseparable from the stator, it is possible to prevent separation of the component parts of the thrust bearings and the one-way clutch when the stator unit is mounted in a torque converter, and to reduce the axial dimension of the stator unit.

BRIEF DESCRIPTION OF THE DRAWINGS

Other features and objects of the present invention will become apparent from the following description made with reference to the accompanying drawings, in which:

FIGS. 5A and 5B are partial enlarged views of a third embodiment of the present invention;

FIGS. 13A, 13B and 13C show how the one-way clutch of FIG. 12 is assembled;

FIG. 18 is a partial enlarged view of another conventional torque converter.

DETAILED DESCRIPTION OF THE PREFERRED EMBODIMENTS

Figure 17:
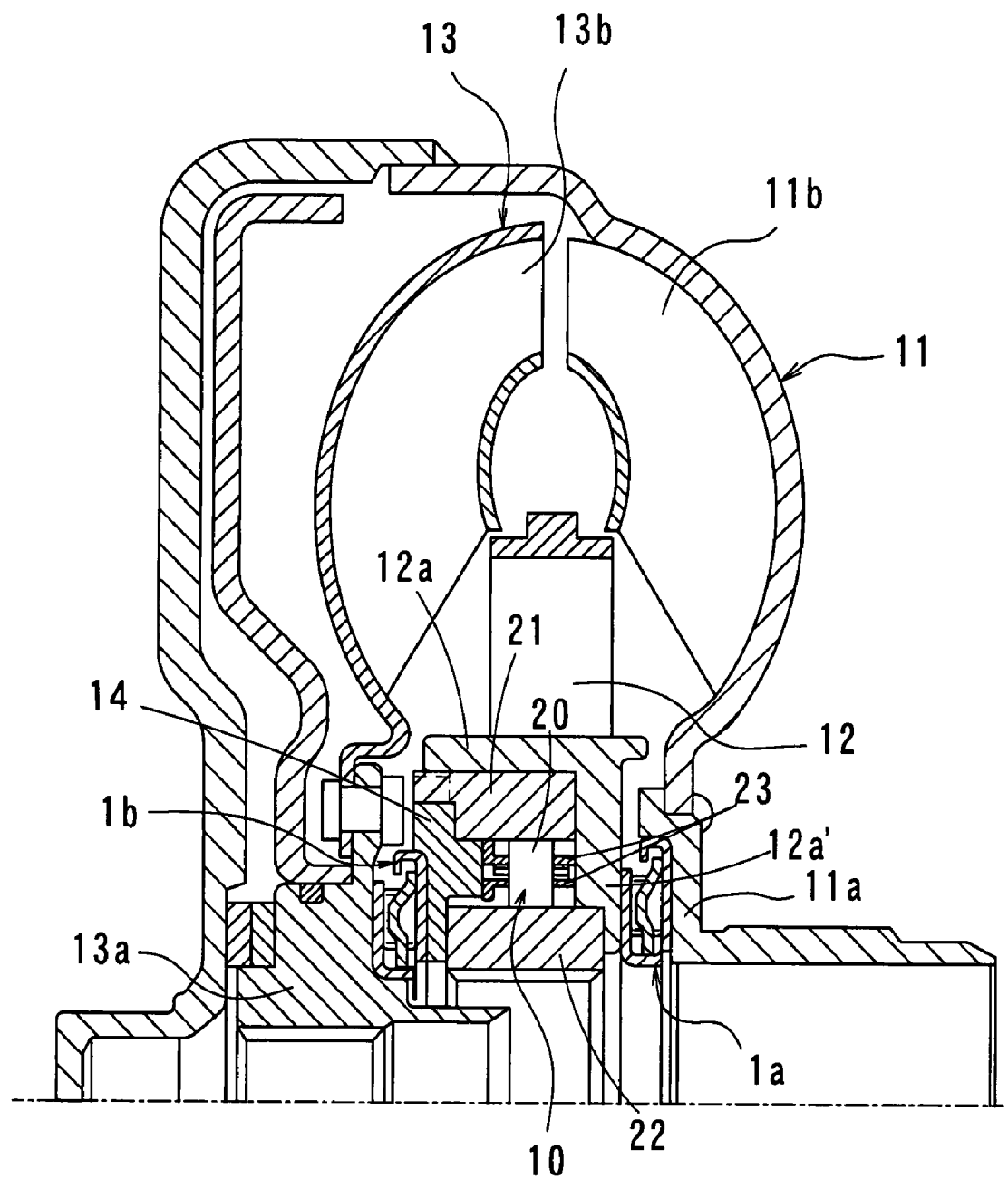
FIG. 17 is a sectional front view of a conventional torque converter.

The first embodiment of this invention is now described with reference to the drawings. The first embodiment is a stator unit mounted between an impeller 11 and a turbine 13 of a torque converter (such as shown in FIG. 17).

Figure 1B:
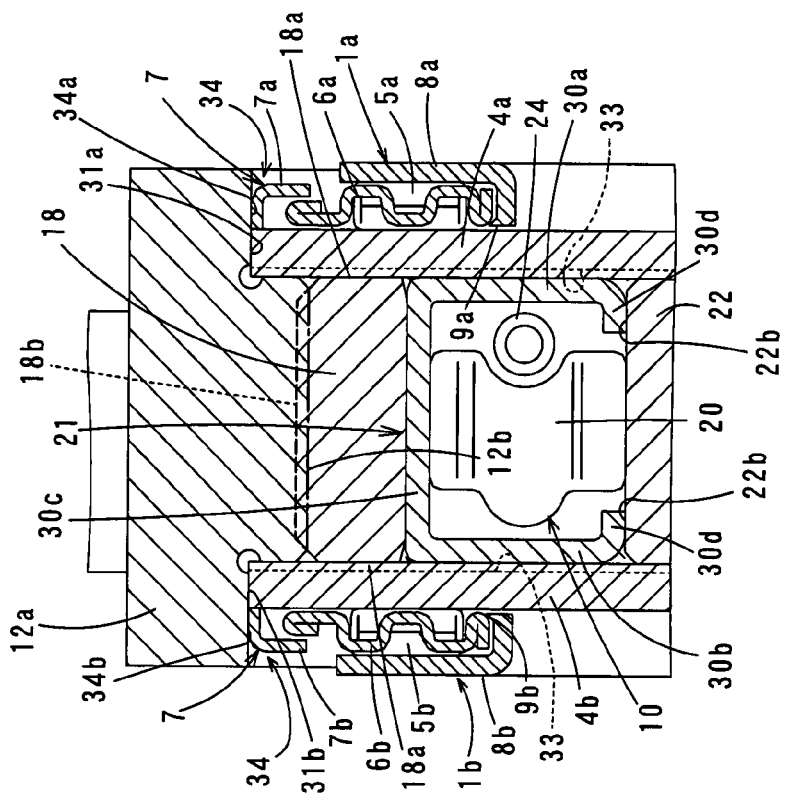
FIGS. 1A and 1B are partial enlarged views of a first embodiment of the present invention.
Figure 1A:
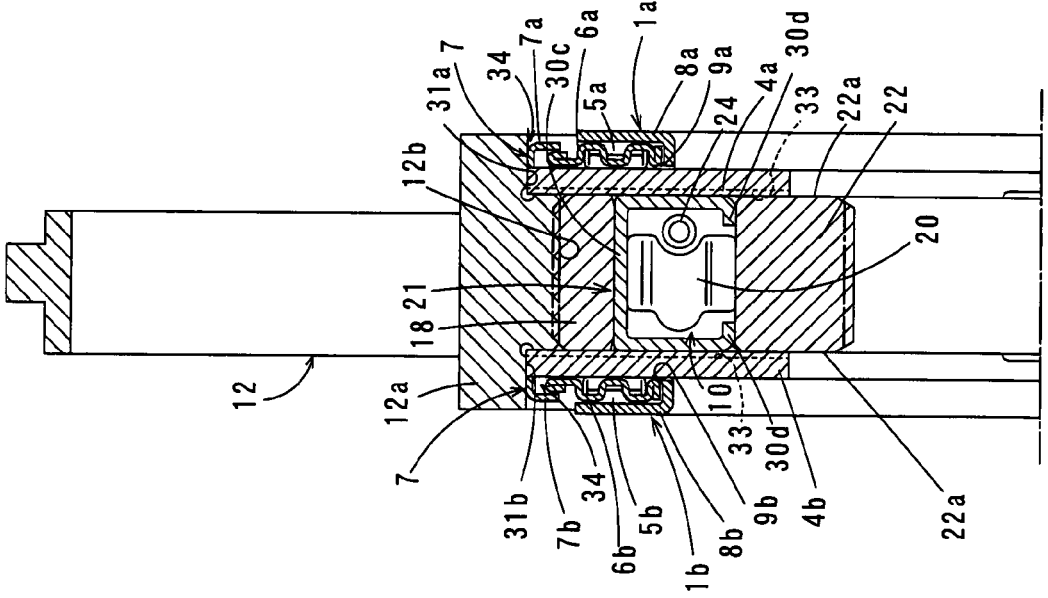

As shown in FIGS. 1A and 1B, the stator unit comprises a stator 12 having a stator hub 12a provided at the radially inner portion thereof, a one-way clutch 10 disposed between the stator 12 and a stator shaft (not shown), and thrust bearings 1a and 1b mounted between the stator hub 12a and an impeller hub 11a provided at the radially inner portion of the impeller 11 and between the stator hub 12a and a turbine hub 13a provided at the radially inner portion of the turbine 13, respectively.

The one-way clutch 10 comprises an outer ring 21 rotationally fixed to the stator hub 12a, an inner ring 22 which can be joined to the outer periphery of the stator shaft through splines, a plurality of sprags 20 circumferentially disposed in an annular space defined between the outer ring 21 and the inner ring 22, and an elastic member 24 biasing the sprags 20 in such a direction that the outer ring 21 and the inner ring 22 are brought into engagement with each other through the sprags 20.

The outer ring 21 is a shell comprising a cylindrical peripheral wall 30c, side walls 30a and 30b each extending radially inwardly from one of the axial side edges of the peripheral wall 30c, and flanges 30d extending axially inwardly from the radially inner edges of the side walls 30a and 30b, respectively. The outer ring 21 is pressed into a fitting member 18 fixed to the radially inner surface of the stator 12 with the outer periphery of the peripheral wall 30c in close contact with the inner periphery of the fitting member 18. The inner ring 22 has its outer periphery in sliding contact with the flanges 30d.

Because such a shell type outer ring is heat-treated beforehand, it is unnecessary to subject the fitting member 18 to heat treatment and no strict accuracy control is necessary, either. Thus, it is possible to reduce the cost.

The sprags 20 are received in the outer ring 21 so as to be brought into and out of engagement with the inner periphery of the peripheral wall 30c and the outer periphery of the inner ring 22. Specifically, when the sprags 20 pivot about their axes, their inner and outer cam surfaces that are kept in contact with the inner and outer rings 22 and 21, respectively, are brought into or out of engagement with the outer periphery of the inner ring 22 and the inner periphery of the outer ring 21, respectively. Torque is thus selectively transmitted between the outer ring 21 and the inner ring 22 according to the position of the sprags 20.

In this embodiment, the elastic member 24 is a coil spring that extends the entire circumference (garter spring), and no retainer or any other positioning means is used for positioning the sprags 20. But a different type of elastic member 24 may be used, and a retainer or any other positioning means may be used to keep the sprags 20 in position.

The thrust bearings 1a and 1b are provided on both axial sides of the stator hub 12a, and each comprise a disk-shaped bearing ring 4a, 4b, radially extending numerous rollers 5a, 5b disposed on the axially outer surface of the bearing ring 4a, 4b so as to roll on the bearing ring 4a, 4b, a retainer 6a, 6b retaining the rollers 5a, 5b, and a stake 7. The retainers 6a and 6b are formed by pressing so as to have a radial sectional shape of the letter W.

The stator hub 12a is formed with engaging steps 34 on both axial sides thereof. The thrust bearings 1a and 1b are pressed into the respective engaging steps 34.

Specifically, the bearing rings 4a and 4b of the thrust bearings 1a and 1b are axially inwardly pressed or inserted into the respective engaging steps 34 from axially outwardly thereof such that their outer peripheries are brought into close contact with bearing ring engaging portions 31a and 31b, i.e. the axially inner portions of the engaging steps 34. Also, the bearing rings 4a and 4b are axially positioned relative to the stator hub 12a by pressing the axially inner end surfaces thereof against the axially inner end surfaces of the respective engaging steps 34.

The stakes 7 are provided axially outwardly of the respective bearing rings 4a and 4b. The stakes 7 are axially inwardly pressed into the respective engaging steps 34 from axially outwardly thereof such that their outer peripheries are brought into close contact with stake engaging portions 34a and 34b, i.e. the axially outer portions of the engaging steps 34. Thus, the thrust bearings 1a and 1b are fixed in position radially inside the stator 12.

The stakes 7 have radially inwardly extending flanges 7a and 7b, respectively, that engage the radially outer edges of the respective retainers 6a and 6b from axially outside thereof. The thrust bearings 1a and 1b further includes second bearing rings 8a and 8b, respectively, that are provided opposite to the bearing rings 4a and 4b with the retainers 6a and 6b and the rollers 5a and 5b sandwiched therebetween. At their radially inner ends, the second bearing rings 8a and 8b have axially inwardly extending claws 9a and 9b, respectively, that engage the radially inner edges of the retainers 6a and 6b from axially inside thereof. Thus, the second bearing rings 8a and 8b are inseparably coupled to the bearing rings 4a and 4b through the retainers 6a and 6b.

The thrust bearings according to the invention are not limited to those shown but may be of other constructions such as ones having no second bearing rings 8a and 8b.

Figure 3B:
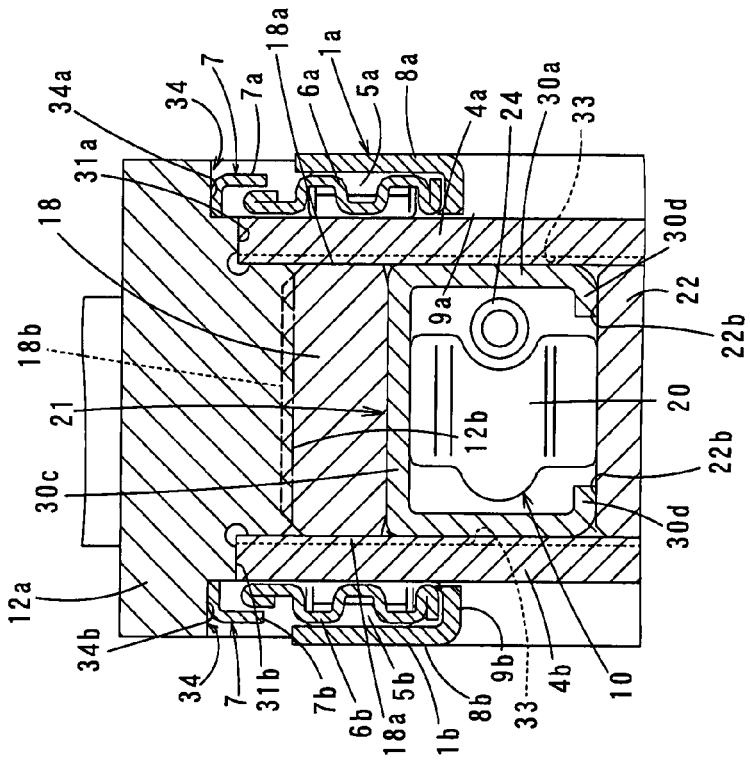
FIGS. 3A and 3B are partial enlarged views of a modified embodiment of the first embodiment.
Figure 3A:
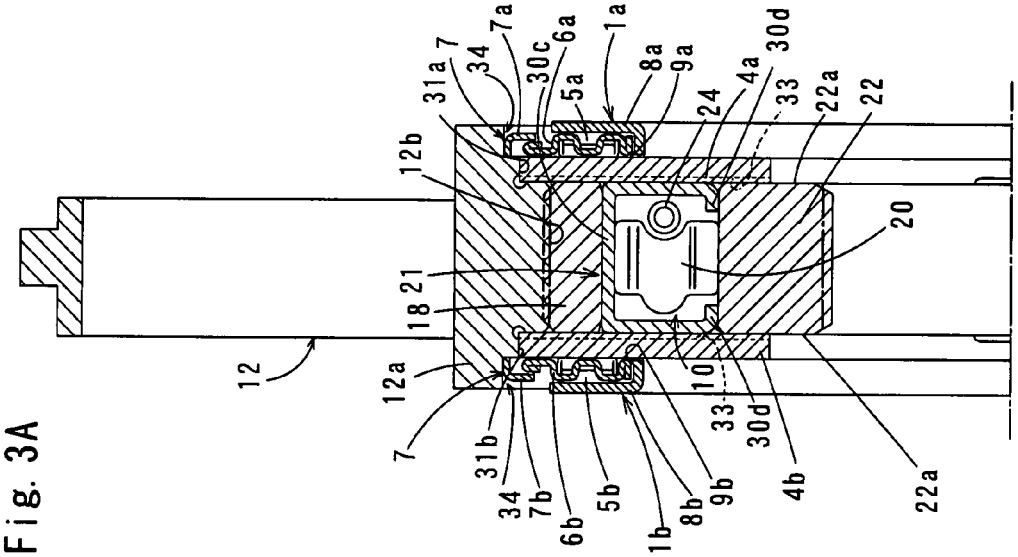

In the embodiment, the bearing ring engaging portions 31a and 31b of the engaging steps 34 are equal in diameter to the stake engaging portions 34a and 34b. But instead, as shown in FIGS. 3A and 3B, the former may have a slightly smaller diameter than the latter. That is, the bearing rings 4a and 4b may have a slightly smaller outer diameter than the stakes 7.

The fitting member 18 has axial ribs 18b on its outer periphery which engage in axial grooves 12b formed in the inner periphery of the stator hub 12b, thereby rotationally fixing the fitting member 18 to the stator hub 12b. In this state, both axial ends 18a of the fitting member 18 are pressed against the axially inner surfaces of the bearing rings 4a and 4b of the respective thrust bearings 1a and 1b, which are pressed into or otherwise in close contact with the engaging steps 34 of the stator hub 12a, so that the fitting member 18 is fixed to the stator hub 12a by being pressed from both axial sides.

The side walls 30a and 30b of the outer ring 21 are also pressed against the axially inner surfaces of the bearing rings 4a and 4b, so that the outer ring 21 is fixed to the stator hub 12a by being pressed from both axial sides. Thus, the outer ring 21, as well as the bearing rings 4a and 4b of the thrust bearings 1a and 1b, rotate together with the stator 12.

The outer ring 21 may be pressed into the fitting member 18. The fitting member 18 may be pressed into the stator hub 12a.

The inner ring 22 has its axial end surfaces 22a slidably kept in close contact with the axially inner surfaces of the bearing rings 4a and 4b of the thrust bearings 1a and 1b and inseparably held by the stator hub 12a by being pressed from both axial sides.

In this state, shoulder portions 22b of the inner ring 22 on both radially outer axial ends thereof are brought into sliding contact with the flanges 30d of the outer ring 21 and serve as slide bearings.

Because the outer ring 21 and the inner ring 22 are inseparably fixed to the stator 12 inside the stator 12 by the bearing rings 4a and 4b and the stakes 7, which are pressed into the stator hub 12a, elements disposed between the outer ring 21 and the inner ring 22, such as the sprags 20 and the elastic member 24, and other elements such as the rollers and the retainers of the thrust bearings can also be inseparably held by the stator 12.

In the sliding surface of each of the bearing rings 4a and 4b, radial lubricating grooves (oil grooves) 33 are formed to extend from the radially inner to outer edge thereof. By feeding lubricating oil into the lubricating grooves 33, it is possible to supply oil to the one-way clutch, as well as to the stator, shaft and turbine.

Figure 2A:
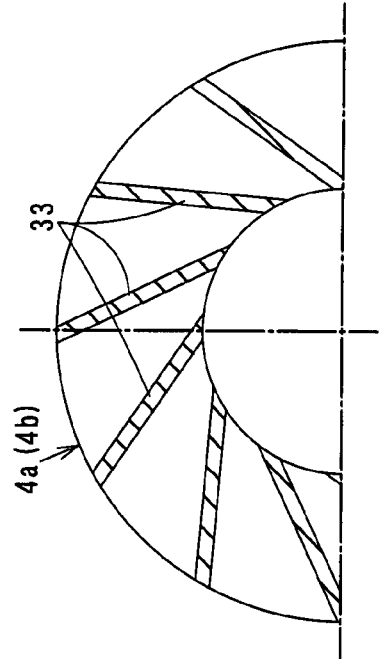
FIGS. 2A, 2B and 2C are partial enlarged views of different bearing rings of thrust bearings.
Figure 2B:
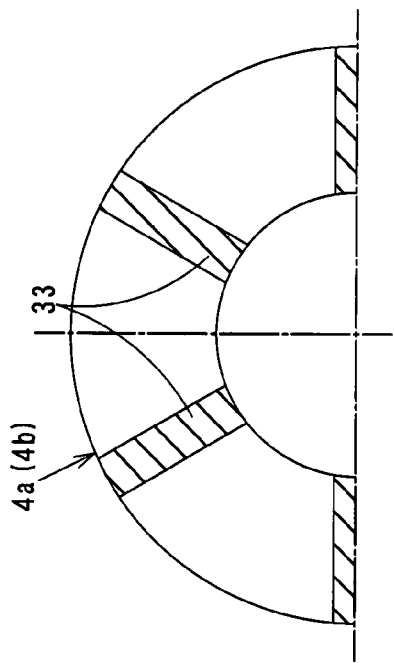
Figure 2C:
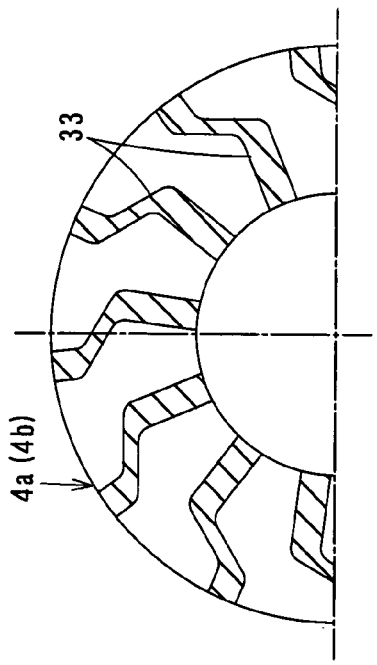

FIGS. 2A to 2C show lubricating grooves 33 of different types. The lubricating grooves 33 shown in FIG. 2A can be easily and thus less costly formed in the bearing rings 4a and 4b. The lubricating grooves 33 shown in FIG. 2B are formed so as to cross the radially extending rollers 5a and 5b, so that it is possible to prevent any of the rollers 5a and 5b from overlapping the back of one of the lubricating grooves 33 over the entire length thereof. This reduces the load on the thin portions where the lubricating grooves 33 are formed, thereby reducing deflection of the thrust raceways. The lubricating grooves 33 shown in FIG. 2C are bent at mid-portions thereof, so that only their portions where the rollers 5a and 5b pass cross the rollers. Thus, the lubricating grooves 33 of FIG. 2C offer the same advantages as the lubricating grooves 33 shown in FIG. 2B.

Figure 4:
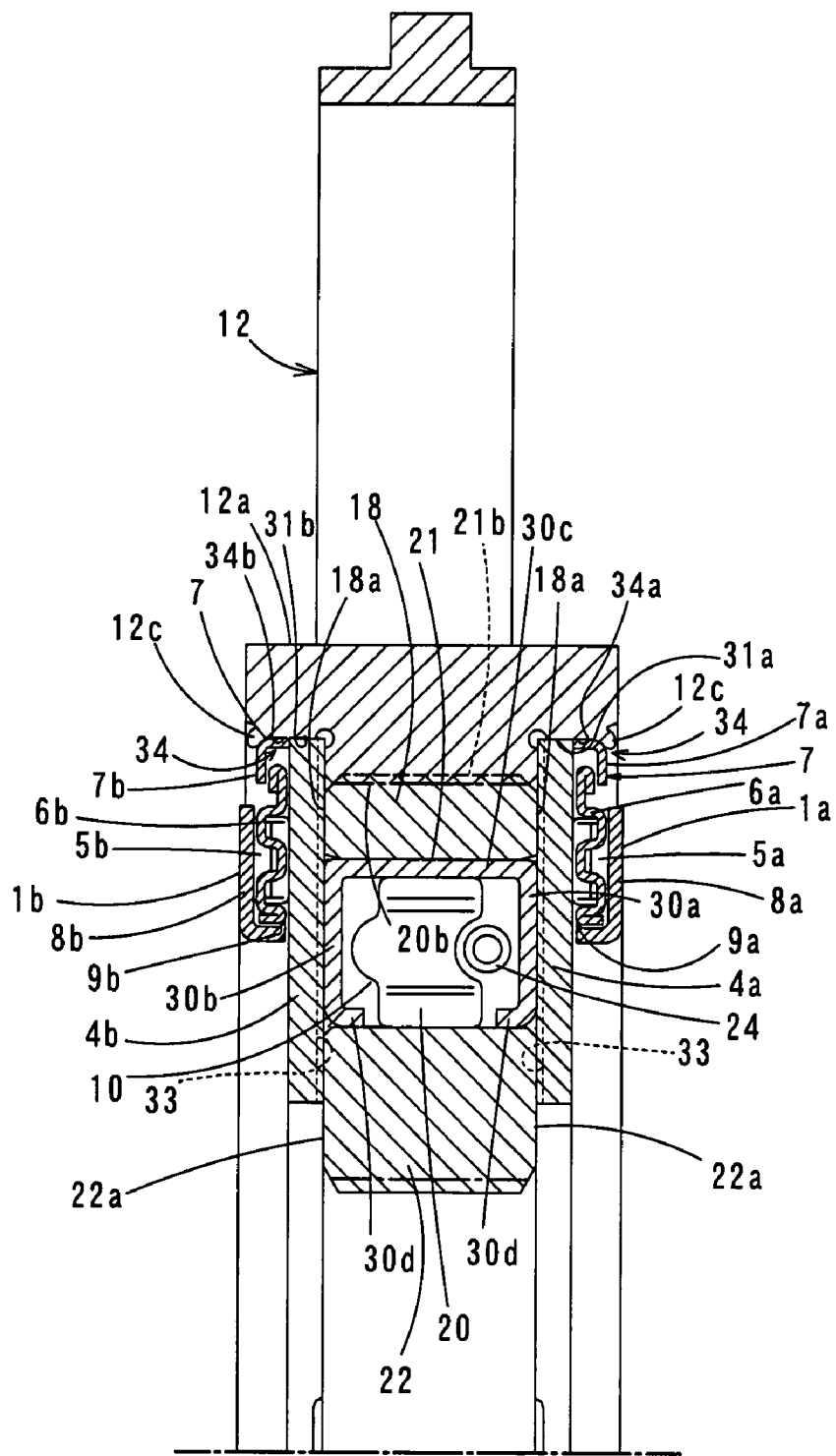
FIG. 4 is a partial enlarged view of a second embodiment of the present invention.

The second embodiment is now described with reference to FIG. 4. In the second embodiment, instead of pressing the stakes 7 of the thrust bearings 1a and 1b of the first embodiment into the engaging steps 34, with the stakes 7 pressed against the engaging steps 34, the radially inner portions of the stator 12 located axially outwardly of the respective stakes 7 so as to face the stakes 7 are crimped to fix the thrust bearings 1a and 1b to the radially inner portion of the stator 12.

Since the stakes 7 are fixed to the radially inner portion of the stator 12 by partially crimping the stator 12, the bearing rings 4a and 4b and the stakes 7 do not necessarily have to be pressed into or brought into close contact with the stator. Thus, gaps are allowed between the inner periphery of the engaging steps 34 (inner periphery of the bearing ring engaging portions 31a and 31b) and the outer periphery of the bearing rings 4a and 4b, and between the inner periphery of the engaging steps 34 (inner periphery of the stake engaging portions 34a and 34b) and the outer periphery of the stakes 7, provided such gaps are small enough not to cause rattling of these members.

The radially inner portions of the stator 12 may be crimped in any known manner to fix the thrust bearings 1a and 1b in position. For example, as shown in FIG. 4, with the thrust bearings 1a and 1b pressed against the engaging steps 34, claws 12c to be crimped which are formed on the stator hub 12a at its portions axially outwardly of the thrust bearings 1a and 1b may be plastically deformed by bending them radially inwardly.

The third embodiment of the present invention is now described with reference to drawings, which is a stator unit used between the impeller 11 and the turbine 13 of a torque limiter (as shown in FIG. 17).

As shown in FIGS. 5A and 5B, the stator unit of the third embodiment comprises a stator 12 having a stator hub 12a provided at the radially inner portion thereof, a one-way clutch 10 disposed between the stator 12 and a stator shaft (not shown), and thrust bearings 1a and 1b mounted between the stator hub 12a and an impeller hub 11a provided at the radially inner portion of the impeller 11 and between the stator hub 12a and a turbine hub 13a provided at the radially inner portion of the hub 13, respectively.

The one-way clutch 10 comprises an outer ring 21 rotationally fixed to the stator hub 12a, an inner ring 22 fixed to the stator shaft through splines, a plurality of sprags 20 circumferentially disposed in an annular space defined between the outer ring 21 and the inner ring 22, and an elastic member 24 biasing the sprags 20 in such a direction that the outer ring 21 and the inner ring 22 are brought into engagement with each other through the sprags 20.

The sprags 20 have inner and outer cam surfaces that are in contact with the inner and outer rings 22 and 21, respectively. When the sprags 20 pivot about their axes, their inner and outer cam surfaces are brought into or out of engagement with the outer periphery of the inner ring 22 and the inner periphery of the outer ring 21, respectively. Torque is thus selectively transmitted between the outer ring 21 and the inner ring 22 according to the position of the sprags 20.

In this embodiment, the elastic member 24 is a coil spring that extends the entire circumference (garter spring), and no retainer or any other positioning means is used for positioning the sprags 20. But a different type of elastic member 24 may be used, and a retainer or any other positioning means may be used to keep the sprags 20 in position.

The thrust bearings 1a and 1b are provided on both axial sides of the stator hub 12a, and each comprise a disk-shaped bearing ring 4a, 4b, radially extending numerous rollers 5a, 5b disposed on the axially outer surface of the bearing ring 4a, 4b so as to roll on the bearing ring 4a, 4b, and a retainer 6a, 6b retaining the rollers 5a, 5b, and a stake 7. The retainers 6a and 6b are formed by pressing so as to have a radial sectional shape of the letter W. The rollers 5a and 5b and the retainers 6a and 6b are held in position by axially inwardly extending claws 9a and 9b formed on second bearing rings 8a and 8b together with the second bearing rings 8a and 8b, and are also held by stakes 7 for preventing axial separation of these members.

The stator hub 12a is formed with engaging steps 34 on both axial sides thereof. The thrust bearings 1a and 1b are pressed into the respective engaging steps 34.

Specifically, the bearing rings 4a and 4b of the thrust bearings 1a and 1b are axially inwardly pressed or inserted into the respective engaging steps 34 from axially outwardly thereof such that their outer peripheries are brought into close contact with bearing ring engaging portions 31a and 31b, i.e. the axially inner portions of the engaging steps 34. Also, the bearing rings 4a and 4b are axially positioned relative to the stator hub 12a by pressing the axially inner end surfaces thereof against the axially inner end surfaces of the respective engaging steps 34.

The stakes 7 are provided axially outwardly of the respective bearing rings 4a and 4b. The stakes 7 are axially inwardly pressed into the respective engaging steps 34 from axially outwardly thereof such that their outer peripheries are brought into close contact with stake engaging portions 34a and 34b, i.e. the axially outer portions of the engaging steps 34. Thus, the thrust bearings 1a and 1b are fixed in position radially inside the stator 12.

The stakes 7 have radially inwardly extending flanges 7a and 7b, respectively, that engage the radially outer edges of the respective retainers 6a and 6b from axially outside thereof. The second bearing rings 8a and 8b of the thrust bearings 1a and 1b are provided opposite to the bearing rings 4a and 4b with the retainers 6a and 6b and the rollers 5a and 5b sandwiched therebetween. The axially inwardly extending claws 9a and 9b, which are formed on the radially inner edges of the second bearing rings 8a and 8b, respectively, engage the radially inner edges of the retainers 6a and 6b from axially inside thereof. Thus, the second bearing rings 8a and 8b are inseparably coupled to the bearing rings 4a and 4b through the retainers 6a and 6b.

The thrust bearings according to the invention are not limited to those shown but may be of other constructions such as ones having no second bearing rings 8a and 8b.

Figure 7A:
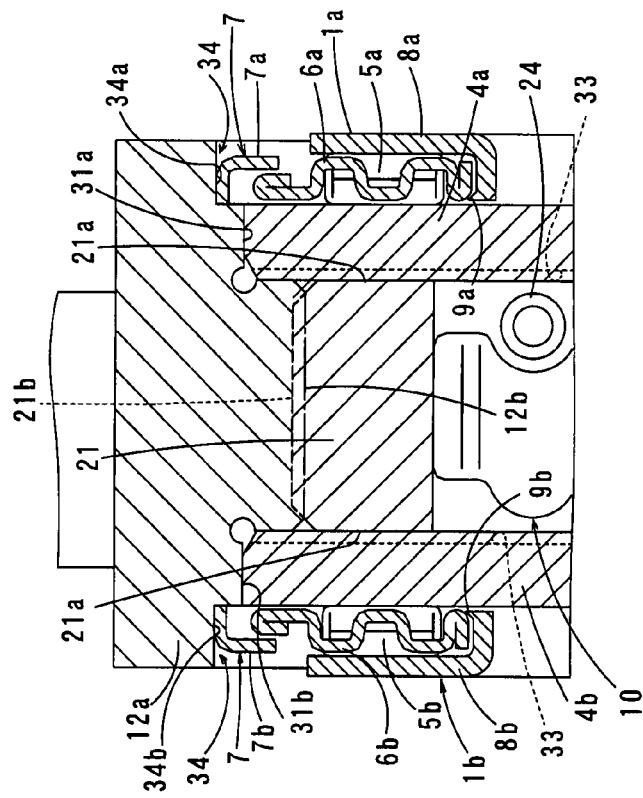
FIGS. 7A and 7B are partial enlarged views of a modified embodiment of the third embodiment, shown in FIGS. 5A and 5B.
Figure 7B:
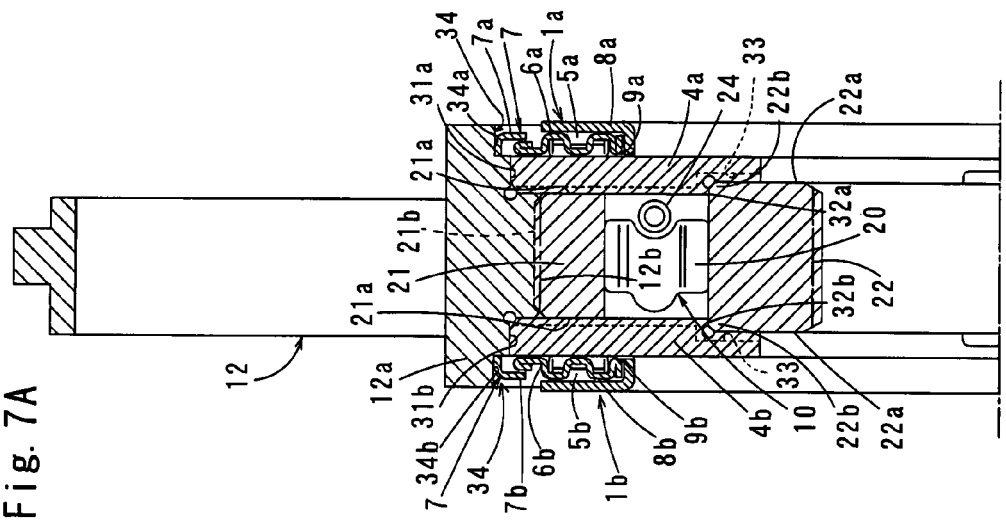

In the embodiment, the bearing ring engaging portions 31a and 31 of the engaging steps 34 are equal in diameter to the stake engaging portions 34a and 34b. But instead, as shown in FIGS. 7A and 7B, the former may have a slightly smaller diameter than the latter have a diameter. That is, the bearing rings 4a and 4b may have a slightly smaller outer diameter than the stakes 7.

The outer ring 21 of the one-way clutch 10 has axial ribs 21b on its outer periphery which engage in axial grooves 12b formed in the inner periphery of the stator hub 12a. In this state, both axial end surfaces 21a of the outer ring 21 are in close contact with the axially inner surfaces of the bearing rings 4a and 4b of the respective thrust bearings 1a and 1b, which are pressed into or otherwise in close contact with the engaging steps 34 of the stator hub 12a. The bearing rings 4a and 4b are pressed from axially outwardly by the stakes 7, which are pressed into the engaging steps 34 of the stator hub 12a or fixed thereto by crimping. Thus, the outer ring 21, as well as the bearing rings 4a and 4b of the thrust bearings 1a and 1b, rotate together with the stator 12.

The outer ring 21 may be pressed into the stator hub 12a. In this arrangement too, because the thrust bearings 1a and 1b have their stakes 7 fixed to the engaging steps 34 of the stator hub 12a, the outer ring 21, as well as the bearing rings 4a and 4b of the thrust bearings 1a and 1b, rotate together with the stator 12.

The bearing rings 4a and 4b of the thrust bearings 1a and 1b are formed with steps 32a and 32b in their axially inner surfaces along the radially inner edges thereof.

The inner ring 22 of the one-way clutch 10 has its axial end surfaces 22a slidably kept in close contact with the axially inner surfaces of the bearing rings 4a and 4b of the thrust bearings 1a and 1b, which are pressed into the engaging steps 34 of the stator hub 12a, and inseparably held by the stator hub 12a by being pressed from both axial sides.

In this state, shoulder portions 22b of the inner ring 22 on both radially outer axial ends thereof slidably fit in the steps 32a and 32b. Thus, the inner surfaces of the steps 32a and 32b and the outer surface of the inner ring 22 are slidable relative to each other, thus forming side bearing portions of the one-way clutch 10.

If the steps 32a and 32b are not formed in the bearing rings 4a and 4b, end bearings may be provided between the outer ring 21 and the inner ring 22.

Because the outer ring 21 and the inner ring 22 are inseparably fixed to the stator 12 inside the stator 12 by the bearing rings 4a and 4b, elements disposed between the outer ring 21 and the inner ring 22, such as the sprags 20 and the elastic member 24, can also be inseparably held by the stator 12.

In the axially inner surfaces of the bearing rings 4a and 4b, radial lubricating grooves (oil grooves) 33 are formed to extend from the radially inner to outer edge thereof. By feeding lubricating oil into the lubricating grooves 33, it is possible to supply oil to the one-way clutch, as well as to the stator, shaft and turbine.

FIGS. 6A to 6D show lubricating grooves 33 of different types.

Figure 6A:
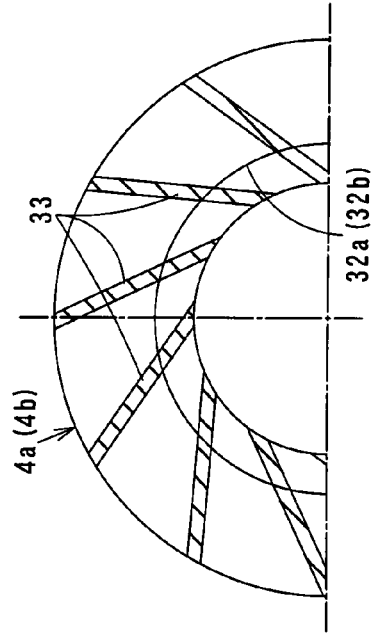
FIG. 6A to 6D are partial enlarged views of different bearing rings of thrust bearings.
Figure 6B:
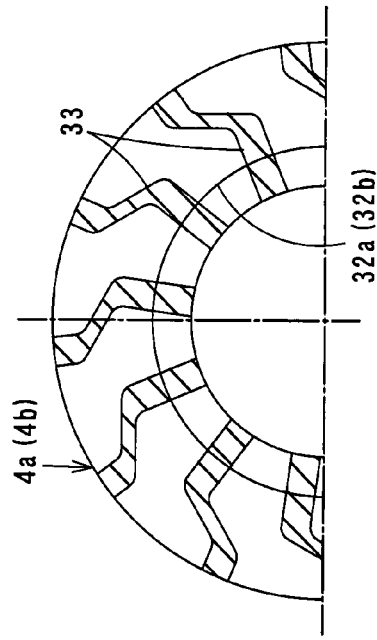
Figure 6C:
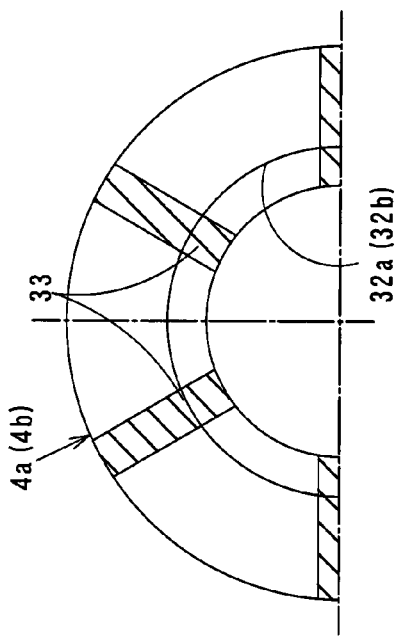
Figure 6D:
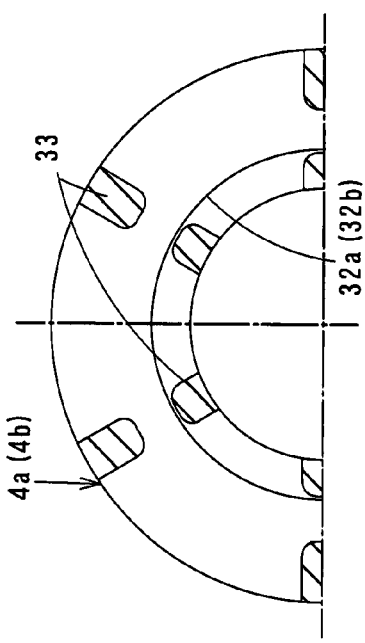

The lubricating grooves 33 shown in FIG. 6A can be easily and thus less costly formed in the bearing rings 4a and 4b. The lubricating grooves 33 shown in FIG. 6B are formed so as to cross the radially extending rollers 5a and 5b, so that it is possible to prevent any of the rollers 5a and 5b from overlapping the back of one of the lubricating grooves 33 over the entire length thereof. This reduces the load on the thin portions where the lubricating grooves 33 are formed, thereby reducing deflection of the thrust raceways. The lubricating grooves 33 shown in FIG. 6C are not formed at portions of the bearing rings 4a and 4b where they are in contact with neither of the inner and outer rings 22 and 21. Because these portions are not in contact with either of the inner and outer rings, enough space is defined at these portions through which oil can flow even without the grooves 33. The lubricating grooves 33 shown in FIG. 6D are bent at mid-portions thereof, so that only their portions where the rollers 5a and 5b pass cross the rollers. Thus, the lubricating grooves 33 of FIGS. 6C and 6D offer the same advantages as the lubricating grooves 33 shown in FIG. 6B.

Figure 8:
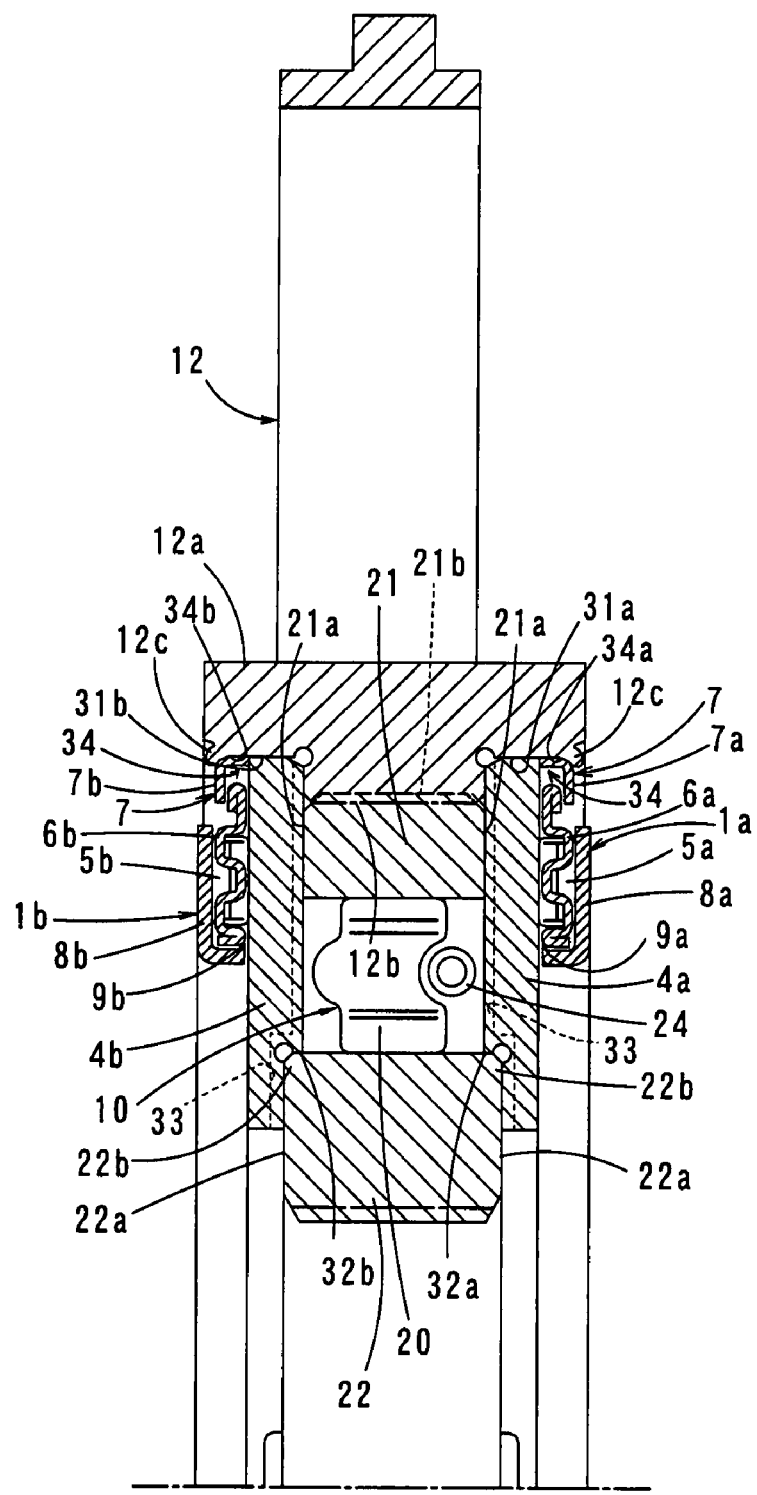
FIG. 8 is a partial enlarged view of a fourth embodiment of the present invention.
Figures 9A, 9B:
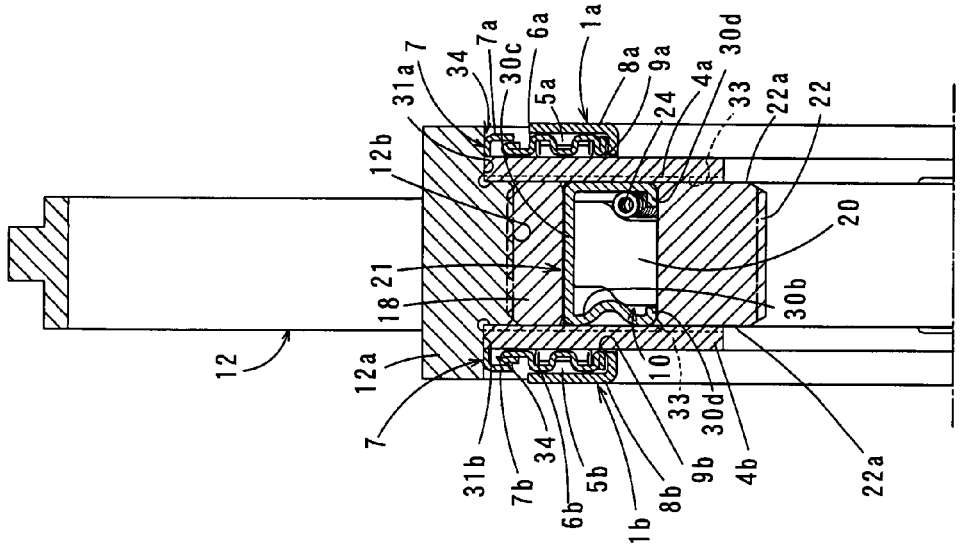
FIGS. 9A and 9B are partial enlarged views of a modified embodiment of the first embodiment.
Figure 10A:
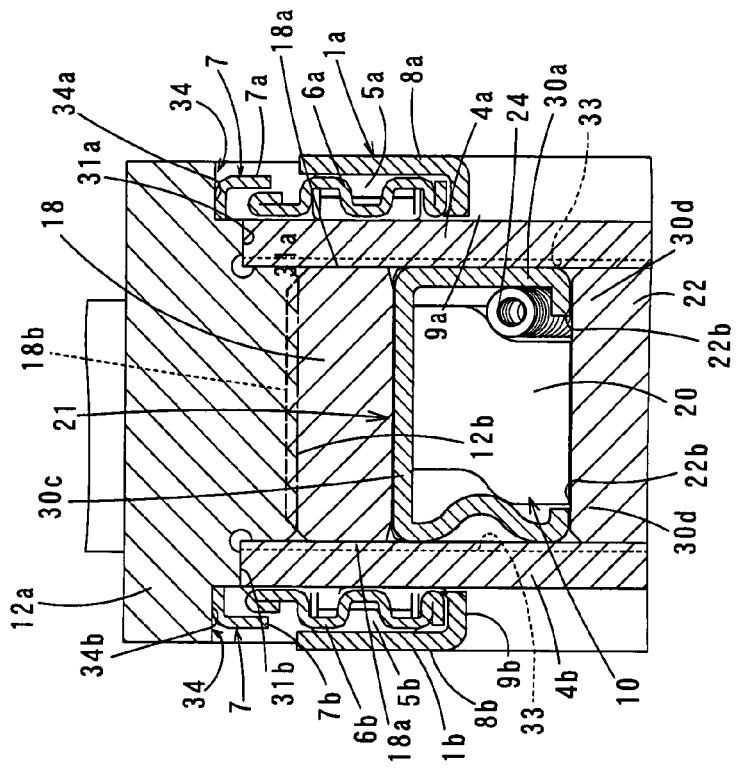
FIGS. 10A and 10B are partial enlarged views of another modified embodiment of the first embodiment.
Figure 10B:
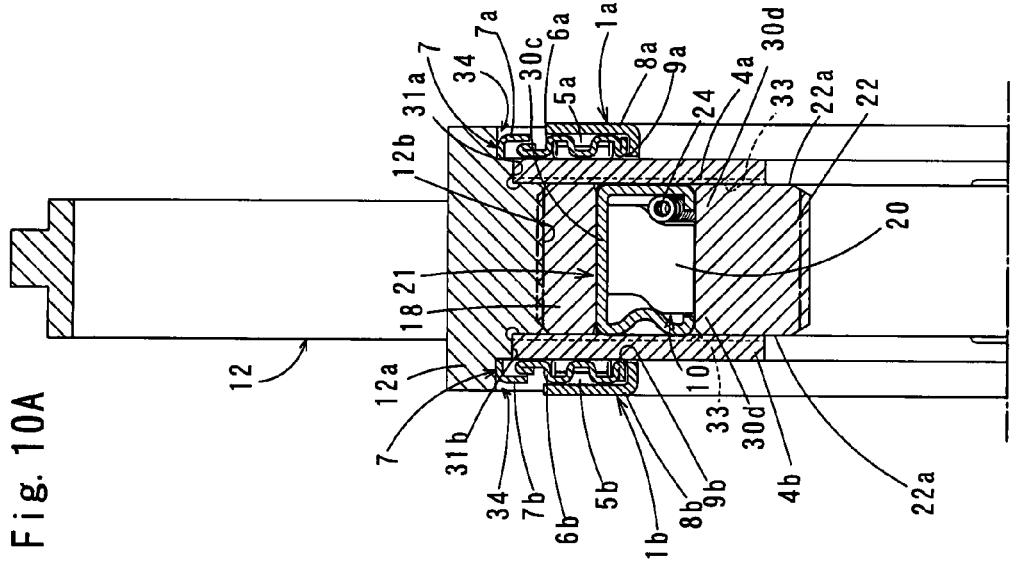
Figure 11:
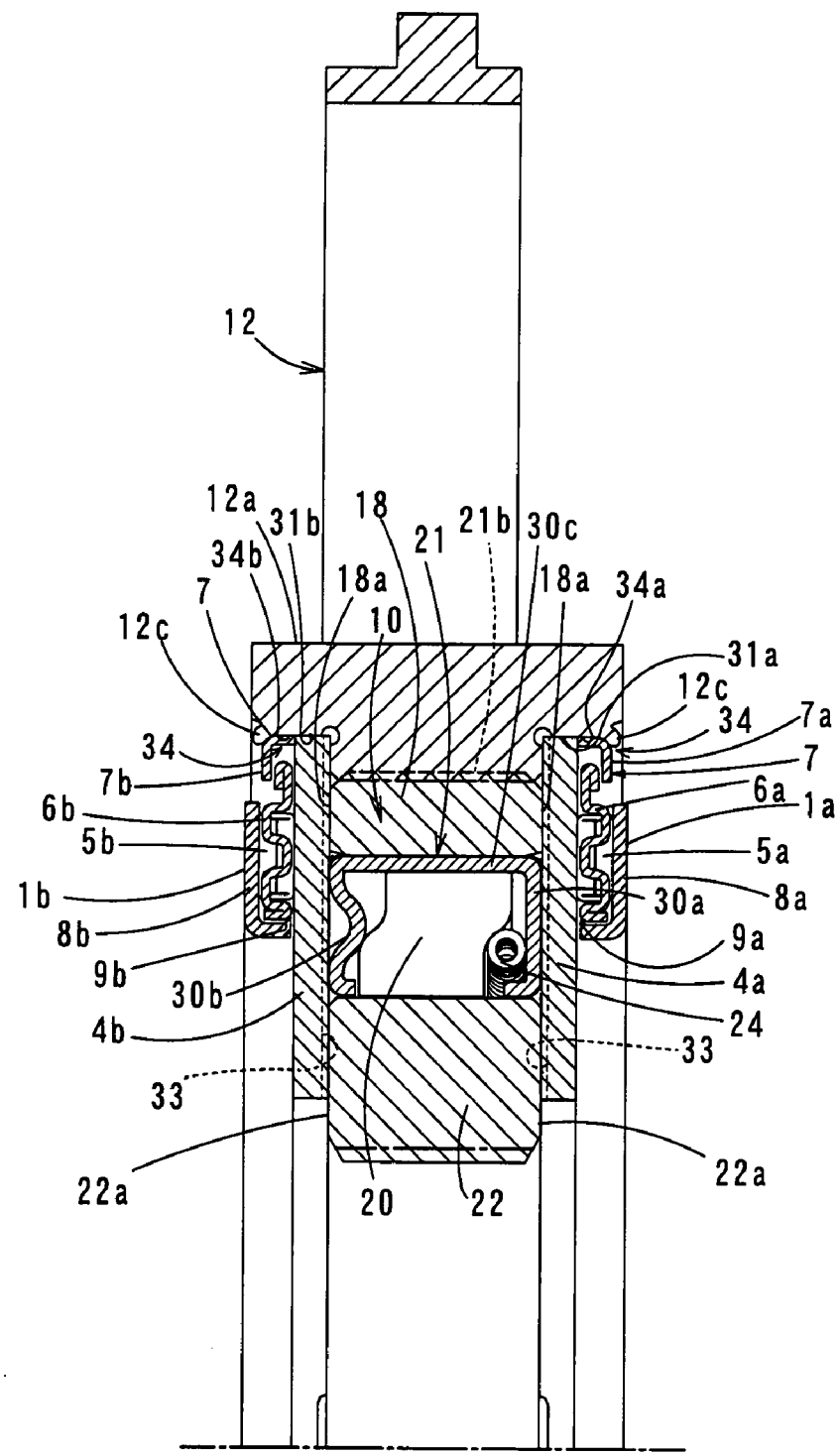
FIG. 11 is a partial enlarged view of a modified embodiment of the second embodiment.

The fourth embodiment is now described with reference to FIG. 8. In the fourth embodiment, instead of pressing the stakes 7 of the thrust bearings 1a and 1b of the third embodiment into the engaging steps 34, with the stakes 7 pressed against the engaging steps 34, the radially inner portions of the stator 12 located axially outwardly of the respective stakes 7 so as to face the stakes 7 are crimped to fix the thrust bearings 1a and 1b to the radially inner portion of the stator 12.

Since the stakes 7 are fixed to the radially inner portion of the stator 12 by partially crimping the stator 12, the bearing rings 4a and 4b and the stakes 7 do not necessarily have to be pressed into or brought into close contact with the stator. Thus, gaps are allowed between the inner periphery of the engaging steps 34 (inner periphery of the bearing ring engaging portions 31a and 31b) and the outer periphery of the bearing rings 4a and 4b, and between the inner periphery of the engaging steps 34 (inner periphery of the stake engaging portions 34a and 34b) and the outer periphery of the stakes 7, provided such gaps are small enough not to cause rattling of these members.

The radially inner portions of the stator 12 may be crimped in any known manner to fix the thrust bearings 1a and 1b in position. For example, as shown in FIG. 8, with the thrust bearings 1a and 1b pressed against the engaging steps 34, claws 12c to be crimped which are formed on the stator hub 12a at its portions axially outwardly of the thrust bearings 1a and 1b may be plastically deformed by bending them radially inwardly.

FIGS. 9A, 9B, 10A, 10B and 11 show embodiments corresponding to the first and second embodiments and including the one-way clutch 10 shown in FIGS. 12, 13A-13C, 14A and 14B.

Figure 12:
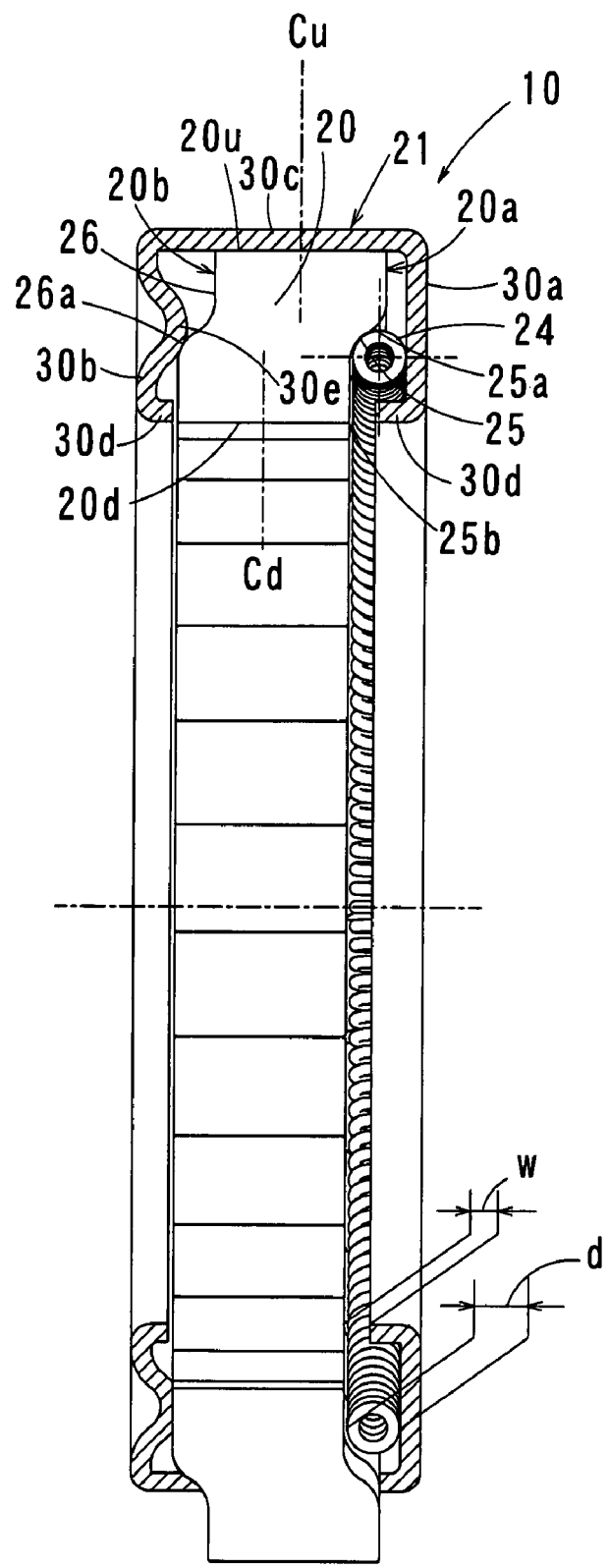
FIG. 12 is a sectional side view of a one-way clutch used in the modified embodiments shown in FIGS. 9 to 11.
Figure 14A:
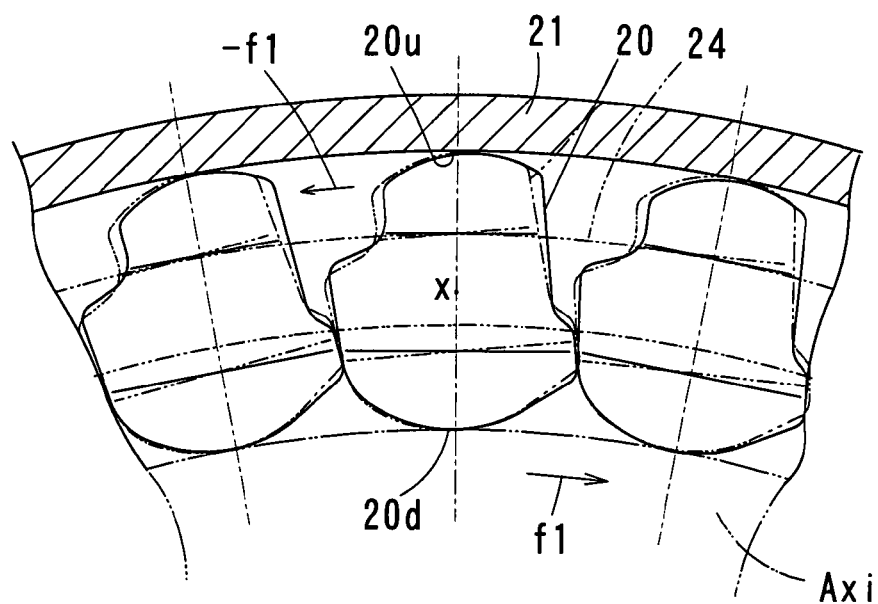
FIGS. 14A and 14B show how the sprags of the one-way clutch operate.
Figure 14B:
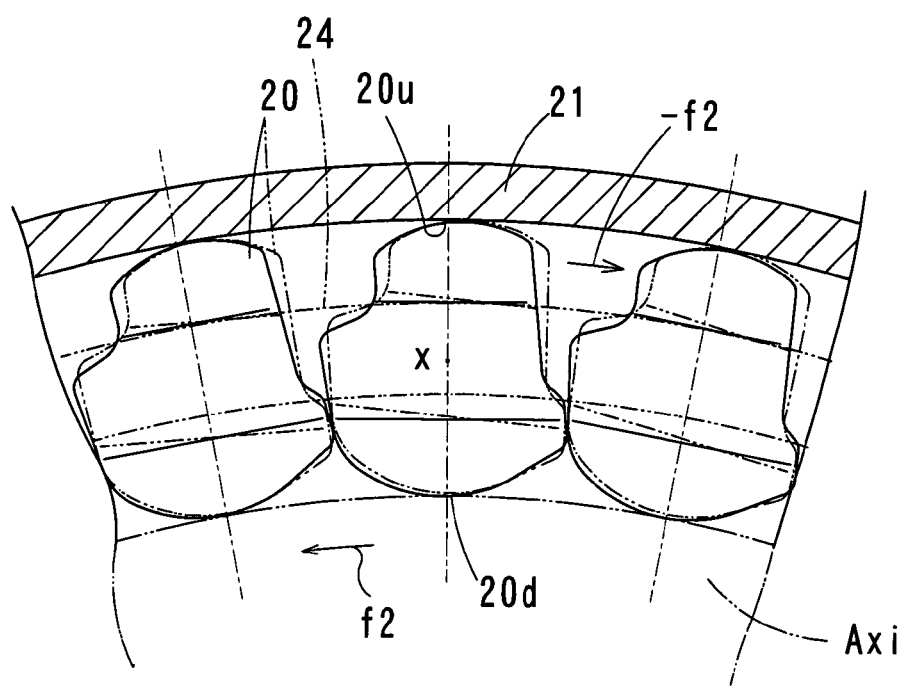

FIG. 12 shows the sectional view of the one-way clutch 10, FIG. 13A-13C show how the one-way clutch is assembled, and FIGS. 14A and 14B show how the sprags operate.

The one-way clutch comprises an inner ring having a cylindrical outer surface, an outer ring 21 having a cylindrical inner surface coaxial with and facing the cylindrical outer surface of the inner ring, and side walls 30a and 30b extending radially inwardly from the respective side edges of the cylindrical inner surface, and a plurality of sprags 20 disposed between the cylindrical outer surface and the cylindrical inner surface. A garter spring 24 is disposed between the sprags 20 and the side wall 30a of the outer ring 21 to extend in the circumferential direction of the side wall 30a. The garter spring 24 biases the sprags 20 such that their radially outer cam surfaces 20u and radially inner cam surfaces 20d engage the cylindrical inner surface and the cylindrical outer surface, respectively.

Figure 15A:
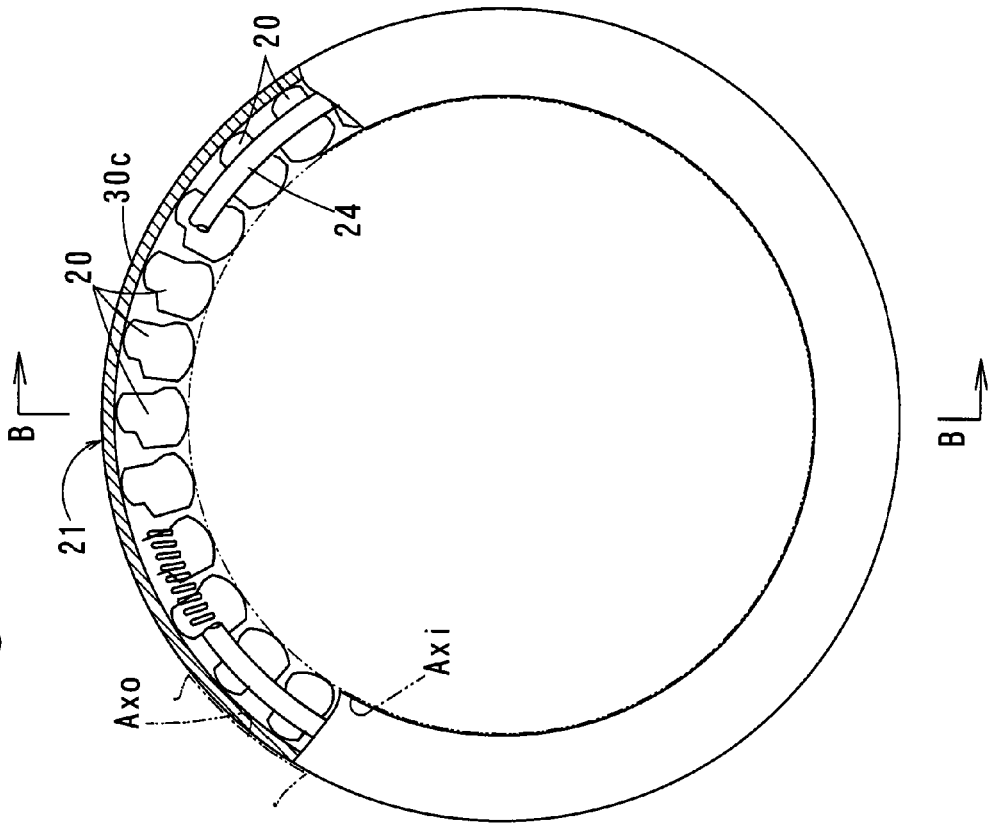
FIG. 15A is a front view of a conventional one-way clutch.

The outer ring 21 has flanges 30d that can abut the inner shaft Axi (see FIG. 15A, which shows the prior art), which corresponds to the inner ring, and defines an opening between the flanges 30d. The outer ring is therefore an annular member having a section in the shape of the letter U. The flanges 30d are arranged such that very small gaps are present between the flanges 30d and the curved surface of the inner shaft Axi.

The sprags 20 are received in the open hollow space of the outer ring 21 so as to be circumferentially arranged in a row, each in contact with the adjacent ones. Each sprag has axial end surfaces 20a and 20b which face the side walls 30a and 30b, respectively. The garter spring 24 is a ring-shaped coil spring provided along the end surfaces 20a of the sprags 20 and having a uniform outer diameter d.

The outer ring 21 is formed by bending the radially outer portion of a flat steel disk by pressing it into a cup, punching out the bottom of the cup, and further bending the outer edge of the bent outer portion of the cup to form a member having a section in the shape of the letter U. Alternatively, the outer ring 21 may be formed by radially inwardly bending both ends of a steel pipe that is equal in diameter to the peripheral wall 30c of the outer ring 21 into a member having a section in the shape of the letter U.

As shown in FIG. 12, which is an axial sectional view (sectional view in the axial direction of the clutch), the side wall 30b of the outer ring 21, i.e. the side wall on the left-hand side of FIG. 12 is slightly recessed axially inwardly to form an axial protrusion 30e. The side wall 30a of the outer ring, i.e. the side wall on the right-hand side of FIG. 12 has radial flat surfaces. The peripheral wall 30c, which is joined to the outer shaft Axo (which corresponds to the fitting member 18 of the embodiment), is cylindrical.

Of the two flanges 30d extending axially inwardly from the radially inner ends of the side walls 30a and 30b of the outer ring 21, before the one-way clutch 10 is assembled, only the flange 30d of the side wall 30b is formed, while the flange 30d of the side wall 30b is not formed, as shown in FIG. 13A. That is, in this state, the radially inner portion of the side wall 30a simply radially extends.

In the end surface 20a of each sprag 20, which faces the side wall 30a, a recess 25 is formed that extends from its radially intermediate point to the radially inner cam surface 20d. The recess 25 is defined by a radially outer inclined surface 25a gradually inclining axially outwardly toward its radially outer edge, and a radially inner flat surface extending radially inwardly from the radially inner edge of the inclined surface 25a to the radially inner edge 25b of the end surface 20a in parallel to the side wall 30a. The garter spring 24 is received between the side wall 30a of the outer ring 21 and the recesses 25 of the sprags 20 while in engagement with the inclined surfaces 25a of the sprags 20.

In the end surface 20b of each sprag 20, which faces the side wall 30b, a recess 26 is formed that extends from its radially intermediate point to the radially outer cam surface 20u. The recess 26 is defined by a radially inner inclined surface 26a gradually inclining axially outwardly toward its radially inner edge, and a radially outer flat surface extending radially outwardly from the radially outer edge of the inclined surface 26a to the radially outer edge of the end surface 20b in parallel to the radially inner flat surface of the recess 25.

The garter spring 24, which is received in the recesses 25, biases the sprags 20 radially outwardly through their inclined surfaces 25a, thus pressing the sprags 20 against the inner surface of the outer ring 21 (inner surface of the peripheral wall 30c). Because the garter spring 24 is disposed between the sprags 20 and the side wall 30a, by pressing the sprags 20 against the outer ring 21, the garter spring 24 is held in position in the outer ring 21 by pressing against the sprags 20 and the side wall 30a.

The sprags 20 are always biased by the garter spring 24 so as to pivot about their central axes parallel to the axis of the clutch until they engage the outer ring 21. That is, the garter spring 24 produces torque shown by f1 and –f1 in FIG. 14A, which biases the sprags 20 in such a direction that the sprags 20 erect, thus engaging the outer ring 21. Also, by biasing the sprags 20 with the garter spring 24, it is possible to prevent axial and circumferential movements of the one-way clutch, as well as its torsional movement, and separation of the sprags 20 during handling.

As shown in FIG. 14A, as viewed in the direction perpendicular to the axis of each sprag 20 (axial direction of the one-way clutch 10), it has an asymmetrical barrel-shaped section with the radially outer and inner cam surfaces 20u and 20d defined by radially outer and inner curved convex ends, respectively. When the sprags 20 are upright with respect to the circumferential direction (i.e. when the distance between the contact points between the cam surface 20u and the inner periphery of the outer ring 21 and between the cam surface 20d and the outer periphery of the inner ring is relatively large), torque is transmitted between the inner shaft Axi and the outer ring 21 (state shown by chain line in FIG. 14A). When the sprags are inclined from this state in the circumferential direction, the inner shaft Axi slips relative to the outer ring 21, so that no torque is transmitted therebetween (state shown by chain line in FIG. 14B).

Movement of the sprags 20 between the positions of chain lines in FIGS. 14A and 14B is actually slight. But for better understanding, the movement of the sprags between solid lines and chain lines in FIGS. 14A and 14B is exaggerated.

Figure 15B:
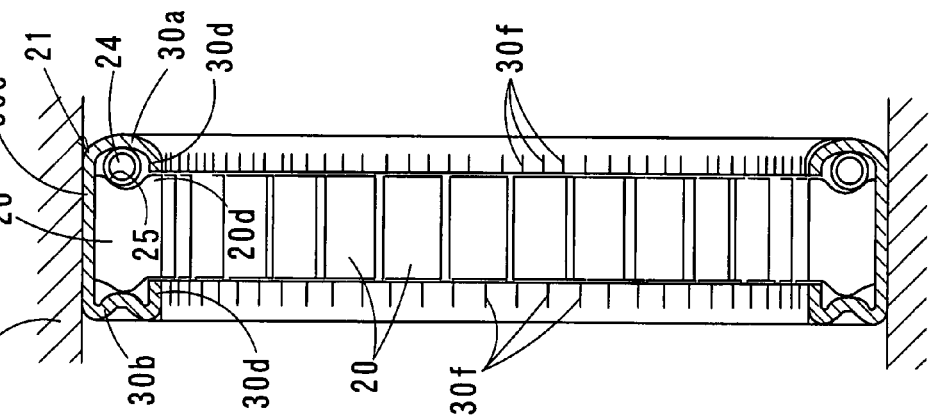
FIG. 15B is a sectional side view taken along line B-B of FIG. 15A.
Figure 16A:
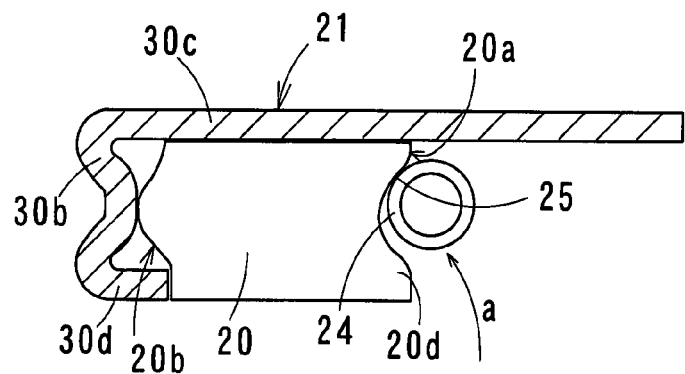
FIGS. 16A, 16B and 16C show how the conventional one-way clutch is assembled.
Figure 16B:
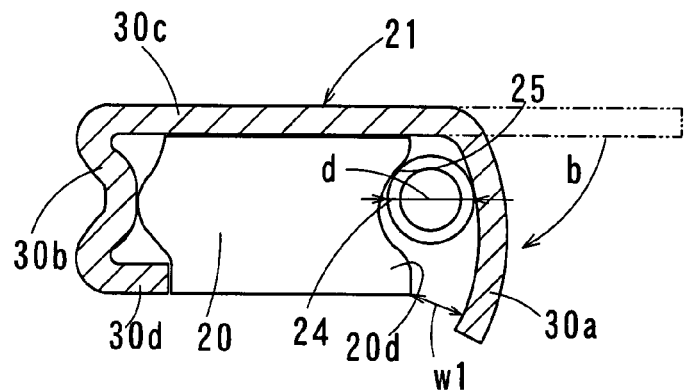
Figure 16C:
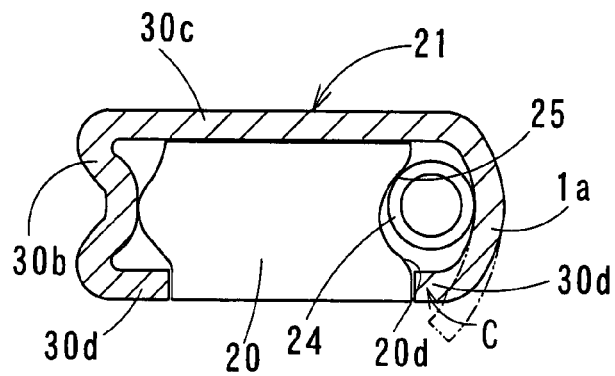

As shown in FIG. 15B, which shows the prior art, oil grooves 30f may be formed in the radially inner surfaces of the flanges 30d (which abut the inner shaft Axi) to define oil reservoirs between the flanges 30d and the inner shaft Axi. Such oil reservoirs serve to better lubricate the contact surfaces of the flanges and the inner shaft.

But if sufficient lubrication is possible without such oil grooves 30f, they may not be formed. Also, if sufficient oil reservoirs can be formed between the radially inner edges of the side walls 30a and 30b and the inner shaft Axi, the flanges 30d are not necessary either.

The inclined surface 26a of the recess 26 formed in the end surface 20b of each sprag 20 has its radially inner rounded portion in abutment with the protrusion 30e formed on the side wall 30b of the outer ring 21 to project toward the end surfaces 20b of the sprags 20. This prevents the skew of the sprags 20, i.e. the state in which the axis of each sprag 20 is not parallel to the axis of the one-way clutch, so that the sprags cannot properly engage.

By preventing the skew of the sprags, it is also possible to reduce wear of the flanges 30d, which serve as side bearings, and the sprags 20.

The operation of the one-way clutch 10 of this embodiment is now described. The sprags 20 are always biased by the garter spring 24 in such a direction that the garter spring 24 radially expands. The sprags 20 are therefore biased such that they pivot about their central axes x that are parallel to the central axis of the clutch, as shown in FIGS. 14A and 14B, so that their radially outer and inner asymmetrical cam surfaces 20u and 20d engage the inner surface of the peripheral wall of the outer ring 21 and the inner shaft Axi under the torque indicated by –f1 and f1.

Thus, if the outer ring 21 is driven by an external source in the direction of the arrow –f1, the sprags 20 move to the upright position, thereby engaging the clutch and rotating the inner shaft Axi, which has been stationary, in the same direction as the outer ring (direction indicated by the arrow f2).

If the outer ring 21 is rotated in the reverse direction, the sprags 20 are pivoted in the reverse direction against the force of the garter spring 24, i.e. inclined from the upright position as shown by chain line in FIG. 14B, so that the clutch disengages, and no torque is transmitted to the inner shaft Axi.

Conversely, if the inner shaft Axi is driven by an external source, if the rotating direction of the inner shaft Axi is the direction indicated by the arrow f1, the clutch engages and the outer ring 21, which has been stationary, is rotated in the same direction as the inner shaft (direction indicated by the arrow −f2). If the inner shaft Axi is being rotated in the reverse direction (direction indicated by the arrow f2), the clutch disengages and no torque is transmitted to the outer ring 21.

Now description is made on how the one-way clutch 10 of this embodiment is assembled. First, as shown in FIG. 13B, the sprags 20 are received one after another in the outer ring 21, which has been formed to the state shown in FIG. 13A. In this state, only the side walls 30a and 30b are formed by bending both sides of the peripheral wall 30c, and the flange 30d of the side wall 30b is not yet formed.

With the sprags 20 received in the outer ring 21, the garter spring 24 is inserted into the recesses 25 of the sprags 20, which are formed in the end surface 20a of each sprag 20, from radially inside the sprags 20.

The radially inner flat surface of the recess 25 of each sprag 20, which extends radially inwardly from the radially inner edge of the inclined surface 25a, connects to the radially inner cam surface 20d through the radially inner edge 25b. The gap w2 (see FIG. 12) defined between the radially inner edge 25b and the side wall 30a is greater than the diameter d of the coil spring forming the garter spring 24.

Thus, with the sprags 20 kept in contact with the side wall 30b, the garter spring 24 can be easily mounted in position.

With the sprags 20 and the garter spring 24 mounted in the outer ring 24 in the above manner, the radially inner end of the side wall 30a is bent axially inwardly to form the flange 30d.

Once the flange 30d is formed, because the gap w between the radially inner edge 25b of the recess 25 of each sprag 20 and the tip of the flange 30d is smaller than the diameter d of the coil spring forming the garter spring 24, it is possible to positively prevent separation of the sprags 20 and the garter spring 24.

As shown in FIG. 13B, the axial edge of the radially inner cam surface 20d near the side wall 30a is axially offset toward the side wall 30b from the axial edge of the radially outer cam surface 20u near the side wall 30a by a distance equal to the axial depth h of the recess 25.

The axial edge of the radially outer cam surface 20u near the side wall 30b is axially offset toward the side wall 30a from the axial edge of the radially inner cam surface 20d near the side wall 30b by a distance equal to the axial depth h of the recess 26.

Because the radially inner and outer cam surfaces 20d and 20u are axially offset from each other, they have equal axial widths, so that the sprags 20 can stably engage the inner and outer rings.

Because the radially inner cam surface 20d of each sprag is axially offset from the radially outer cam surface 20u toward the side wall 30b, as shown in FIG. 12, the radial centerline Cd that passes the mid-point between the axial edges of the radially inner cam surfaces 20d is axially offset toward the side wall 30b from the radial centerline Cu that passes the mid-point between the axial edges of the radially outer cam surfaces 20u.

Thus, radially outer pressing force transferred from the inner ring to the sprags 20 through their radially inner cam surfaces 20d is transferred to the peripheral wall 30c of the outer ring 30 through points of the radially outer cam surfaces 20u that are axially offset from the centerline Cu toward the side wall 30b.

But because the end surfaces 20b of the sprags 20 are in abutment with the protrusion 30e formed on the side wall 30b of the outer ring 21, the protrusion 30e counteracts the radially outer pressing force that is offset toward the side wall 30b, thereby preventing the portions of the sprags 20 near the side wall 30b from being radially outwardly moved more remarkably than the portions of the sprags 20 near the side wall 30a.

More specifically, the inclined surface 26a formed on the end surface 20b of each sprag 20 abuts the protrusion 30e. The inclined surface 26a gradually inclines axially outwardly toward its radially inner edge. Thus, the protrusion 30e can easily counteract the radially outer pressing force applied to the sprags 20.

In any of the embodiments, the inner ring 22 is the inner shaft Axi. But instead, the inner ring 22 may be an annular ring 22 fixedly fitted on a shaft. The outer ring 21 may be a tubular shaft.

What is claimed is:

1. A stator unit for a torque converter including an impeller and a turbine, said stator unit comprising a stator disposed between the impeller and the turbine of the torque converter, a one-way clutch disposed between said stator and a stator shaft, and thrust bearings each disposed between said stator and one of the impeller and the turbine, said one-way clutch comprising an outer ring comprising a peripheral wall extending over the entire circumference, first and second side walls each extending radially inwardly from one of two axial side edges of said peripheral wall, and first and second flanges extending axially inwardly from radially inner edges of said first and second side walls, respectively, said outer ring being fixed to a radially inner portion of said stator, an inner ring which can be fixed to the stator shaft and having an outer surface that is in sliding contact with said first and second flanges, and sprags disposed in said outer ring between an inner surface of said peripheral wall and an outer surface of said inner ring so as to be selectively engageable with said inner surface of said peripheral wall and said outer surface of said inner ring.

2. The stator unit of claim 1 wherein each of said thrust bearings comprises a bearing ring, rollers supported on said bearing ring so as to roll on said bearing ring, and a stake, each of said thrust bearings being pressed into said stator from one of two axial sides thereof until an axial inner surface of said bearing ring is pressed against one of said first and second side walls of said outer ring and one of two axial end surfaces of said inner ring.

3. The stator unit of claim 2 wherein said stator has radially inner engaging steps on both axial sides thereof, said thrust bearings being pressed into and fixed to said stator by pressing said stakes into said respective engaging steps.

4. The stator unit of claim 1 wherein each of said thrust bearings comprises a bearing ring, rollers supported on said bearing ring so as to roll on said bearing ring, and a stake, said stator having radially inner engaging steps on both axial sides thereof, said bearing ring of each of said thrust bearings being fixed to a radially inner portion of said stator by crimping a radially inner portion of said stator that is opposed to one of said stakes with said stake in contact with one of said respective engaging steps so that an axial inner surface of said bearing ring is pressed against one of said first and second side walls of said outer ring and one of two axial end surfaces of said inner ring.

5. The stator unit of claim 2 wherein said bearing ring of each of said thrust bearings is formed with lubricating grooves in an axially inner surface thereof that extends from a radially inner edge thereof toward a radially outer edge thereof.

6. The stator unit of claim 2 wherein said inner ring has an outer cylindrical surface, and said outer ring has an inner cylindrical surface coaxial with and facing said outer cylindrical surface of said inner ring, said first and second side walls of said outer ring extending radially inwardly from both axial sides of said inner cylindrical surface of said outer ring, said sprags being disposed between said outer cylindrical surface of said inner ring and said inner cylindrical surface of said outer ring and each having radially outer and inner cam surfaces, said one-way clutch further comprising a garter spring disposed between said sprags and said first side wall to extend in the circumferential direction so as to bias said sprags in such a direction that said radially outer and inner cam surfaces engage said inner cylindrical surface of said outer ring and said outer cylindrical surface of said inner ring, respectively, whereby torque is selectively transmitted between said inner and outer rings through said sprags, each of said sprags having first and second axial end surfaces facing said first and second side walls, respectively, said first axial end surface being formed with a recess extending from an intermediate portion thereof to said radially inner cam surface, said garter spring being received in said recesses of said respective sprags, thereby radially outwardly biasing said sprags.

7. The stator unit of claim 6 wherein said radially inner cam surfaces of said sprags are axially offset from and equal in axial width to said radially outer cam surfaces of said sprags.

8. The stator unit of claim 6 wherein said second side wall of said outer ring has an axially inwardly extending protrusion, said sprags having their second axial end surfaces in abutment with said protrusion.

9. The stator unit of claim 6 wherein a gap is defined between a free end of said first flange and each of said sprags, said gap being smaller than the diameter of said garter spring.

10. A method of manufacturing the one-way clutch of the stator unit for a torque converter according to claim 9, said method comprising forming said first and second side walls of said outer ring, mounting said sprags in said outer ring, fitting said garter spring into said recesses of said sprags from radially inside said outer ring, and forming said first flange by axially bending the radially inner edge of said first side wall.

11. A stator unit for a torque converter including an impeller and a turbine, said stator unit comprising a stator disposed between the impeller and the turbine of the torque converter, a one-way clutch disposed between said stator and a stator shaft, and thrust bearings each disposed between said stator and one of the impeller and the turbine, each of said thrust bearings comprising a bearing ring, and rollers supported on said bearing ring so as to roll on said bearing ring, said one-way clutch comprising an outer ring fixed to a radially inner portion of said stator, an inner ring which can be fixed to an outer surface of the stator shaft, and sprags disposed between an inner surface of said outer ring and an outer surface of said inner ring so as to be selectively engageable with said inner surface of said outer ring and said outer surface of said inner ring, each of said thrust bearings being pressed into said stator from one of two axial sides thereof until an axial inner surface of said bearing ring is pressed against one of two axial end surfaces of said outer ring and one of two axial end surfaces of said inner ring, wherein each of said thrust bearings further comprises a stake, said stator having radially inner engaging steps on both axial sides thereof, said thrust bearings being pressed into and fixed to said stator by pressing said bearing rings into or against said respective engaging steps and pressing said stakes into said respective engaging steps at their portions axially outside said bearing rings.

12. The stator unit of claim 11 wherein said bearing rings of said thrust bearings are formed with steps in their axially inner surfaces along the radially inner edges thereof, said inner ring having radially outer shoulder portions which are in sliding contact with said steps of said bearing rings, respectively.

13. The stator unit of claim 12 wherein said bearing ring of each of said thrust bearings is formed with lubricating grooves in an axially inner surface thereof that extend from a radially inner edge thereof toward a radially outer edge thereof.

14. A stator unit for a torque converter including an impeller and a turbine, said stator unit comprising a stator disposed between the impeller and the turbine of the torque converter, a one-way clutch disposed between said stator and a stator shaft, and thrust bearings each disposed between said stator and one of the impeller and the turbine, each of said thrust bearings comprising a bearing ring, rollers supported on said bearing ring so as to roll on said bearing ring, and a stake, said one-way clutch comprising an outer ring fixed to a radially inner portion of said stator, an inner ring which can be fixed to an outer surface of the stator shaft, and sprags disposed between an inner surface of said outer ring and an outer surface of said inner ring so as to be selectively engageable with said inner surface of said outer ring and said outer surface of said inner ring, said stator having radially inner engaging steps on both axial sides thereof, said bearing ring of each of said thrust bearings being fixed to a radially inner portion of said stator by pressing said bearing ring into or against said respective engaging steps and by crimping a radially inner portion of said stator that is opposed to one of said stakes with said stake in contact with one of said respective engaging steps so that an axial inner surface of said bearing ring is pressed against one of two axial end surfaces of said outer ring and one of two axial end surfaces of said inner ring.

* * * * *